US008230361B2

(12) United States Patent
Goldberg et al.

(10) Patent No.: US 8,230,361 B2
(45) Date of Patent: Jul. 24, 2012

(54) CONTENT FEED USER INTERFACE

(75) Inventors: Steven L. Goldberg, San Carlos, CA (US); Christopher Jason Wetherell, San Francisco, CA (US); Mihai Parparita, New York, NY (US); Kevin David Fox, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 902 days.

(21) Appl. No.: 11/863,207

(22) Filed: Sep. 27, 2007

(65) Prior Publication Data

US 2008/0082941 A1 Apr. 3, 2008

Related U.S. Application Data

(60) Provisional application No. 60/827,414, filed on Sep. 28, 2006.

(51) Int. Cl.
*G06F 3/048* (2006.01)
(52) U.S. Cl. ........................ 715/815; 715/823; 715/830
(58) Field of Classification Search .................. 715/815, 715/823, 830, 784, 207, 739, 744, 785, 817
See application file for complete search history.

(56) References Cited

U.S. PATENT DOCUMENTS

| | | | |
|---|---|---|---|
| 5,872,921 A | | 2/1999 | Zahariev et al. |
| 6,138,147 A | | 10/2000 | Weaver et al. |
| 6,154,752 A | * | 11/2000 | Ryan ............................ 715/202 |
| 6,831,667 B1 | * | 12/2004 | Russin et al. ................. 715/835 |
| 7,293,019 B2 | | 11/2007 | Dumais et al. |
| 7,360,167 B2 | * | 4/2008 | Hennum et al. ............... 715/772 |
| 7,412,534 B2 | | 8/2008 | Tsang et al. ................... 709/231 |
| 7,581,166 B2 | | 8/2009 | Renger et al. |
| 7,665,036 B1 | * | 2/2010 | Lin et al. ........................ 715/810 |
| 7,770,130 B1 | * | 8/2010 | Kaptelinin ..................... 715/787 |
| 7,818,659 B2 | | 10/2010 | Kahn et al. |
| 7,865,830 B2 | | 1/2011 | Kim et al. |
| 2002/0165881 A1 | | 11/2002 | Shelton |
| 2003/0097453 A1 | | 5/2003 | Fuchigami et al. |

(Continued)

FOREIGN PATENT DOCUMENTS

CN 1473301 A 2/2004

(Continued)

OTHER PUBLICATIONS

International Search Report and Written Opinion for International application No. PCT/US2007/079981, mailed Feb. 20, 2008.

(Continued)

*Primary Examiner* — Kieu Vu
*Assistant Examiner* — Blaine T. Basom
(74) *Attorney, Agent, or Firm* — Morgan, Lewis & Bockius LLP

(57) ABSTRACT

A content feed aggregator displays an ordered list of content items, including a selected item and a set of other items. The selected item is displayed in an expanded format while the other items are simultaneously displayed in a compact format. At least one respective item in compact format is displayed above the selected item and at least one respective item in compact format displayed below the selected item. In response to a user action for selecting a second item in the displayed list, the ordered list of content items is redisplayed with the second item displayed in the expanded format and the other items, including the first item, displayed in the compact format.

22 Claims, 17 Drawing Sheets

U.S. PATENT DOCUMENTS

| | | | |
|---|---|---|---|
| 2003/0184583 A1 | 10/2003 | Lim | 345/738 |
| 2004/0189695 A1 | 9/2004 | Kurtz et al. | 345/738 |
| 2005/0021680 A1 | 1/2005 | Ekis et al. | |
| 2005/0033657 A1 | 2/2005 | Herrington et al. | 705/26 |
| 2005/0114790 A1* | 5/2005 | Dunbar et al. | 715/785 |
| 2005/0135361 A1 | 6/2005 | Lim et al. | |
| 2005/0289468 A1* | 12/2005 | Kahn et al. | 715/738 |
| 2006/0015651 A1 | 1/2006 | Freimuth et al. | |
| 2006/0031335 A1 | 2/2006 | Carey | |
| 2006/0059225 A1* | 3/2006 | Stonehocker et al. | 709/202 |
| 2006/0073812 A1 | 4/2006 | Venkata et al. | 455/412.1 |
| 2006/0095507 A1 | 5/2006 | Watson | |
| 2006/0173985 A1 | 8/2006 | Moore | 709/223 |
| 2006/0230021 A1 | 10/2006 | Diab et al. | 707/3 |
| 2006/0265503 A1 | 11/2006 | Jones et al. | |
| 2007/0027865 A1 | 2/2007 | Bartz et al. | |
| 2007/0038712 A1 | 2/2007 | Affronti et al. | 709/246 |
| 2007/0130589 A1 | 6/2007 | Davis et al. | |
| 2007/0162842 A1 | 7/2007 | Ambachtsheer et al. | |
| 2007/0168522 A1 | 7/2007 | Van Valen, III | |
| 2007/0174487 A1 | 7/2007 | Busey | 709/246 |
| 2007/0240041 A1* | 10/2007 | Pearson | 715/522 |
| 2008/0117911 A1 | 5/2008 | Rajakarunanayake et al. | |

FOREIGN PATENT DOCUMENTS

| | | |
|---|---|---|
| WO | WO 2005/089336 | 9/2005 |

OTHER PUBLICATIONS

"GettingStartedRojo," 6 pages, Nov. 27, 2005, http://web.archive.org/web/20051127084615/rojo.jot.com/GettingStartedRojo.

"Rojo's Frequently Asked Questions (FAQ)," 13 pages, Dec. 2, 2005, http://web.archive.org/web/20051202045411/rojo.jot.com/FAQ.

"Rojo Tour," 27 pages, Aug. 1, 2005, http://web.archive.org/web/20050801014123/rojo.jot.com/RojoTour.

Daily, G., "Aggregating the Aggregators RSS Reader Round-Up," EcontentMag.com, vol. 28, No. 4, Apr. 2005, pp. 38-40, WWW.ECONTENTMAG.COM.

Kennedy, D.M., "Beating Information Overload with News Aggregators," Law Practice Management, vol. 29, No. 8, Nov. 2003, pp. 38-42.

Nottingham, N., et al., "The Atom Syndication Format," The Internet Society, Aug. 15, 2005, http://www.ietf.org/internet-drafts/draft-ieft-atompub-format-11.txt.

Paterson, C., "Feeding Time," Personal Computer World, vol. 27, No. 2, Feb. 2004, pp. 101-104.

Winer, D., "RSS 2.0 Specification," Jan. 30, 2005, http://blogs.law.harvard.edu/tech/rss.

Daily, G., "Aggregating the Aggregators RSS Reader Round-Up," Econtent, Online, Inc., vol. 28, No. 4, Apr. 2005, pp. 38-40.

Hammersley, B., "Content Syndication with RSS," [Online] Mar. 2003, O'Reilly, USA, URL: http://safari.oreilly.com/0596003838 , [retrieved on Jan. 15, 2007], Chapters 9-10.

International Search Report and Written Opinion for International application No. PCT/US2006/039263, mailed Feb. 26, 2007.

Anonymous, *RSSOwl Elements: The Main screen*, web.archive.org/web/20060908002519/http://tutorial.rssowl.org/elements.html, retrieved on Sep. 8, 2006, 3 pages.

Office Action, Chinese Patent Application 200780044075.8, Sep. 13, 2010, 8 pages.

Supplementary European Search Report, European Patent Application 07843545, Oct. 11, 2010, 4 pages.

Google, Australian Patent Application 2006302318, Office Action, Mar. 8, 2011, 2 pgs.

Google, Canadian Patent Application 2624868, Office Action, May 10, 2011, 3 pgs.

Google, European Patent Application 07843545.0, Office Action, Jul. 13, 2011, 5 pgs.

Google, PCT Application PCT/US06/39566, International Preliminary Report on Patentability, Mar. 25, 2010, 10 pgs.

* cited by examiner

CONTENT FEED USER INTERFACE

RELATED APPLICATIONS

This application claims priority to U.S. Provisional Patent Application No. 60/827,414, titled "Content Feed User Interface," filed Sep. 28, 2006, which is incorporated herein by reference in its entirety.

This application is related to the following U.S. patent applications, which are incorporated by reference herein in their entirety:

U.S. patent application Ser. No. 11/246,597, titled "Indirect Subscriptions to A User's Selected Content Feed Items," filed Oct. 7, 2005;

U.S. patent application Ser. No. 11/246,596, titled "Personalized Content Feed Suggestions Page," filed Oct. 7, 2005;

U.S. patent application Ser. No. 11/246,657, titled "Content Feed User Interface with Gallery Display of Same-Type Items," filed Oct. 7, 2005; and U.S. patent application Ser. No. 11/246,656, titled "Indirect Subscriptions to Top N Lists of Content Feeds," filed Oct. 7, 2005.

TECHNICAL FIELD

The disclosed embodiments relate generally to content syndication, and more particularly, to a content feed user interface with multiple modes for viewing content feed items.

BACKGROUND

Content syndication is growing in popularity as a way to distribute frequently updated information, such as news and blog postings, on the Internet. Using content syndication formats such as Really Simple Syndication (RSS), content providers can include content and/or links to such content in a content feed. Users may subscribe to these content feeds using an application known as a feed reader, content feed reader, feed aggregator or content feed aggregator. When the content feed is updated with new content items, the new content items are reflected in the user's reader.

A user may subscribe to many content feeds, with each feed listing multiple content items. Looking through a dense list of content items to locate items of interest can be a cumbersome task for the user.

Accordingly, there is a need for a more efficient manner of presenting content items to the user.

SUMMARY

A method of presenting content includes displaying an ordered list of content items, including a selected item and a set of other items. The other items are displayed in a compact format and the selected item is simultaneously displayed in an expanded format. The displayed list of content items includes at least one respective item in compact format displayed above the selected item and at least one respective item in compact format displayed below the selected item.

A system for presenting content includes memory, one or more processors, and one or more programs stored in the memory and configured for execution by the one or more processors. The one or more programs include instructions to display an ordered list of content items, including a selected item and a set of other items. The display instructions include instructions to display the other items in a compact format and simultaneously display the selected item in an expanded format. The displayed list of content items includes at least one respective item in compact format displayed above the selected item and at least one respective item in compact format displayed below the selected item.

A computer readable storage medium stores one or more programs configured to be executed by a computer system. The one or more programs include instructions to display an ordered list of content items, including a selected item and a set of other items. The display instructions include instructions to display the other items in a compact format and simultaneously display the selected item in an expanded format. The displayed list of content items includes at least one respective item in compact format displayed above the selected item and at least one respective item in compact format displayed below the selected item.

A system for presenting content includes means for displaying an ordered list of content items, including a selected item and a set of other items. The means for displaying include means for displaying the other items in a compact format and simultaneously displaying the selected item in an expanded format. The displayed list of content items includes at least one respective item in compact format displayed above the selected item and at least one respective item in compact format displayed below the selected item.

BRIEF DESCRIPTION OF THE DRAWINGS

Like reference numerals refer to corresponding parts throughout the drawings.

DESCRIPTION OF EMBODIMENTS

In a content feed aggregation system, a user may subscribe to one or more content feeds and be presented with the content items included in those content feeds. The content items may be presented to the user in an ordered list, such that the format of each item in the list is uniform. However, the user may desire to view additional information about selected content items beyond that provided by a uniform list. The disclosed embodiments provide the user a way to view additional information about selected items. For example, in one mode of operation, when a user selects a first content item, the selected item is displayed in an expanded format, and other items are displayed in a compact format. When the user subsequently selects a second content item, the second item is displayed in the expanded format and the first item is displayed in the compact format.

Content feeds are also herein called feed streams. The feed items from a content feed source can be considered to be a stream of items. Furthermore, some embodiments of the content feed aggregation and distribution system described herein allow users to define virtual streams that incorporate content items from content feeds and/or other virtual streams. Thus, in these embodiments, the term "feed streams" also encompasses virtual streams defined by the users of the content feed aggregation and distribution system.

Figure 1:
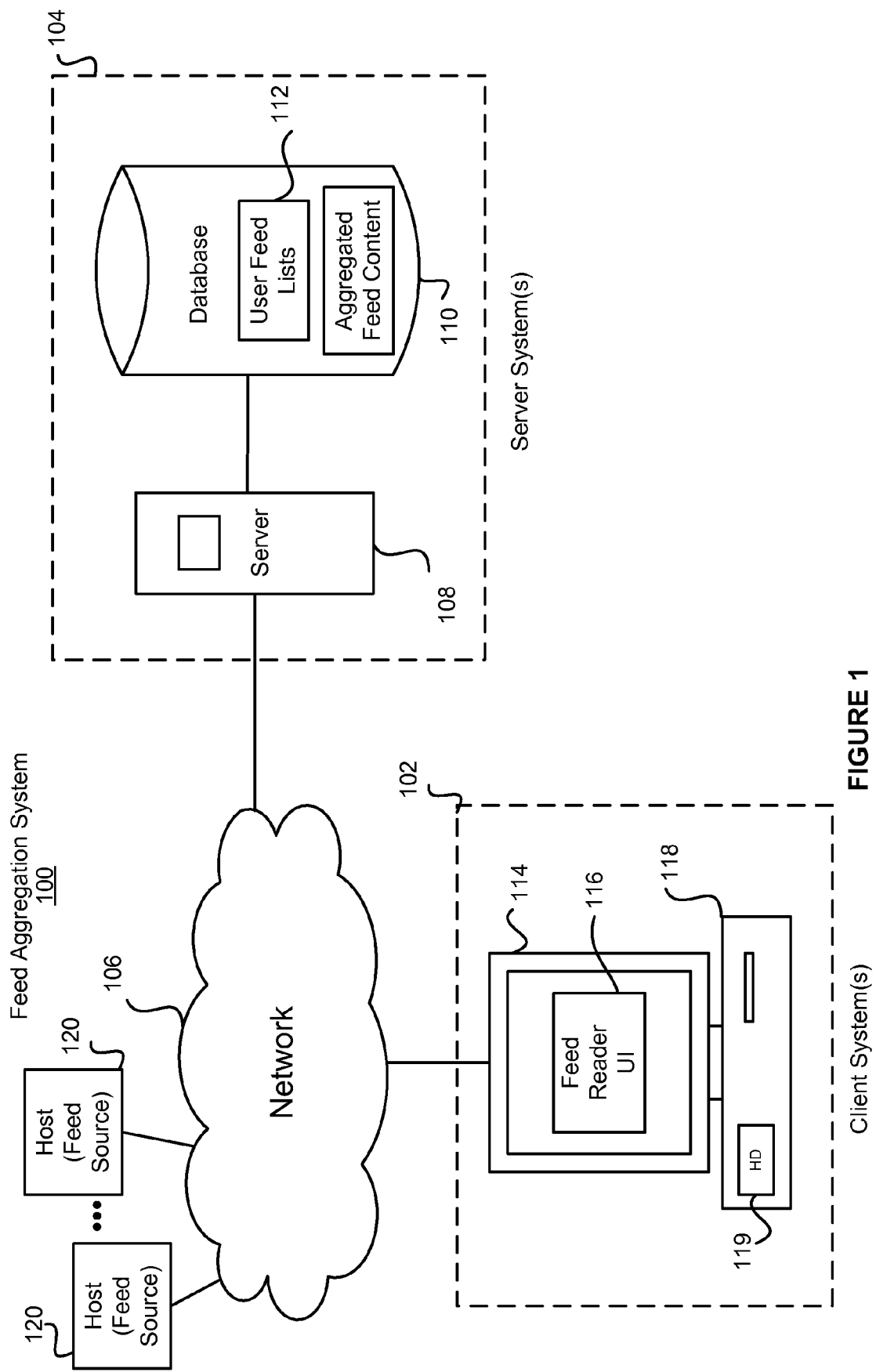
FIG. 1 is a block diagram illustrating a content feed aggregation system in accordance with some embodiments.

FIG. 1 is a block diagram illustrating a content feed aggregation system in accordance with some embodiments. The content feed aggregation system 100 includes a server system 104. The server system 104 is coupled to one or more client systems 102 and to one or more hosts 120 (or "feed sources") by a network 106. The network 106 may be any suitable wired and/or wireless network and may include a local area network (LAN), wide area network (WAN), the Internet, metropolitan area network (MAN), or any combination of such networks.

The server system 104 accesses content feeds from the feed sources 120. The server system 104 includes a server 108 and a database 110. Server 108 serves as a front-end for the server system 104. Server 108, sometimes called a front end server, retrieves the content feeds from the feed sources 120, and also provides an interface between the server system 104 and the client systems 102. In some embodiments, the functions of server 108 may be divided or allocated among two or more servers.

The server system 104 stores content items in the content feeds in the database 110. In some embodiments, the database 110 stores both metadata (e.g., title, description, URL, date/time, and possibly other metadata) and the content of each content item. However, in some other embodiments, the database 110 stores the metadata but not the content for each content item. The database 110 also stores user feed information 112 for a plurality of users. The user feed information for a particular user identifies content feed subscriptions, as well as sources, filters, and read states for that particular user. That is, user feed information associated with a user identifies the content feeds to which the user has subscribed, any filters the user has defined for the feeds, any labels the user has associated with individual feed items, and an indication of whether each feed item has been marked as "read" by the user.

It should be appreciated that the server system 104, including the server 108 and the database 110, may be implemented as a distributed system of multiple computers. However, for convenience of explanation, the server system 104 is described below as being implemented on a single computer, which can be considered a single logical system.

A content feed (or channel) is a resource or service that provides a list of content items that are present, recently added, or recently updated at a feed source 120. A content item in a content feed may include the content associated with the item itself (the actual content that the content item specifies), a title (sometimes called a headline), and/or a description of the content, a locator (e.g., URL) of the content, or any combination thereof. For example, if the content item identifies a text article, the content item may include the article itself inline, along with the title (or headline), and locator. Alternatively, a content item may include the title, description and locator, but not the article content. Thus, some content items may include the content associated with those items, while others contain links to the associated content but not the full content of the items. A content item may also include additional metadata that provides additional information about the content. The full version of the content may be any machine-readable data, including but not limited to web pages, images, digital audio, digital video, Portable Document Format (PDF) documents, and so forth.

In some embodiments, a content feed is specified using a content syndication format, such as RSS. RSS is an acronym that stands for "rich site summary," "RDF site summary," or "Really Simple Syndication." "RSS" may refer to any of a family of formats based on the Extensible Markup Language (XML) for specifying a content feed and content items included in the feed. In some other embodiments, other content syndication formats, such as the Atom syndication format or the VCALENDAR calendar format, may be used to specify content feeds.

Further information regarding the RSS syndication format known as "Really Simple Syndication" is disclosed in the *RSS 2.0 Specification* by D. Winer, which is hereby incorporated by reference herein in its entirety. M. Nottingham et al. disclose further information regarding the Atom syndication format in *The Atom Syndication Format*, which is hereby incorporated by reference herein in its entirety.

A user interfaces with the server system 104 and views content items at a client system or device 102 (hereinafter called the client system for ease of reference). The client system 102 includes a computer 118 or computer controlled device, such as a personal digital assistant (PDA), cellular telephone or the like. The computer 118 typically includes one or more processors (not shown); memory, which may include volatile memory (not shown) and non-volatile memory such as a hard disk drive 119; and a display 114. The computer 118 may also have input devices such as a keyboard and a mouse (not shown).

In some embodiments, a user may interact with the server system 104 via a feed reader user interface 116 that may be presented on the display 114. The user may create a list of feed subscriptions via the feed reader user interface 116. In some embodiments, using the feed reader user interface 116, the user may also create filters or labels to be applied to content feeds and/or content items, and modify the read states of content feeds and/or content items. The feed reader user interface transmits a list of content feed subscriptions, or modifications to a list of content feed subscriptions, to the server system 104 for storage at the database 110. The feed reader user interface 116 presents content items stored at the database 110 to the user based on the user's list of content feed subscriptions. That is, feed reader user interface 116 presents to the user content items specified in the content feeds to which the user has subscribed. A user may view the full version of the content of a content item in the feed reader user interface 116 by selecting it (e.g., by clicking on it with a mouse pointer). In some embodiments, a copy of the user's list of content feed subscriptions and copies of the presented content items may be cached locally at the client system 102.

In some embodiments, the feed reader user interface 116 may be a web-based user interface. That is, the feed reader user interface 116 includes one or more web pages. It is noted that a single web page can contain multiple frames, each of which may appear (when displayed by a browser application) to be a distinct web page. The web page(s) may be written in the Hypertext Markup Language (HTML), Extensible Markup Language (XML), or any other suitable language for preparing web pages, and may include one or more scripts for interfacing with the server system 104. For example, the web page(s) may include a Javascript application that interfaces with the server system 104 via an application programming interface (API). The Javascript application receives content items from the server system 104, manages the rendering of those content items at the client, and also performs the client-side aspects of other tasks, such as marking items as read, adding and removing content feed subscriptions, labeling content feed subscriptions and/or individually selected content items, selecting or revising user preferences, and the like. The user may subscribe to content feeds, view content items, and otherwise interact with the server system 104 by interacting with the web page(s) of the feed reader user interface 116. In other words, the server system 104, including the feed reader user interface 116, provides a web-based content aggregation service. The server system 104 aggregates and stores content items in accordance with the user's content feed subscriptions. In some embodiments, the server system 104 can also apply filters or labels, or change the read states of content items in accordance with user actions or instructions. When the user accesses the feed reader user interface 116, the content items are presented to the user via the feed reader user interface 116.

In some other embodiments, the feed reader user interface 116 may be a part of a standalone application that is run on the client system 102. The standalone application may interface with the server system 104 via an application programming interface (API).

Figure 2A:
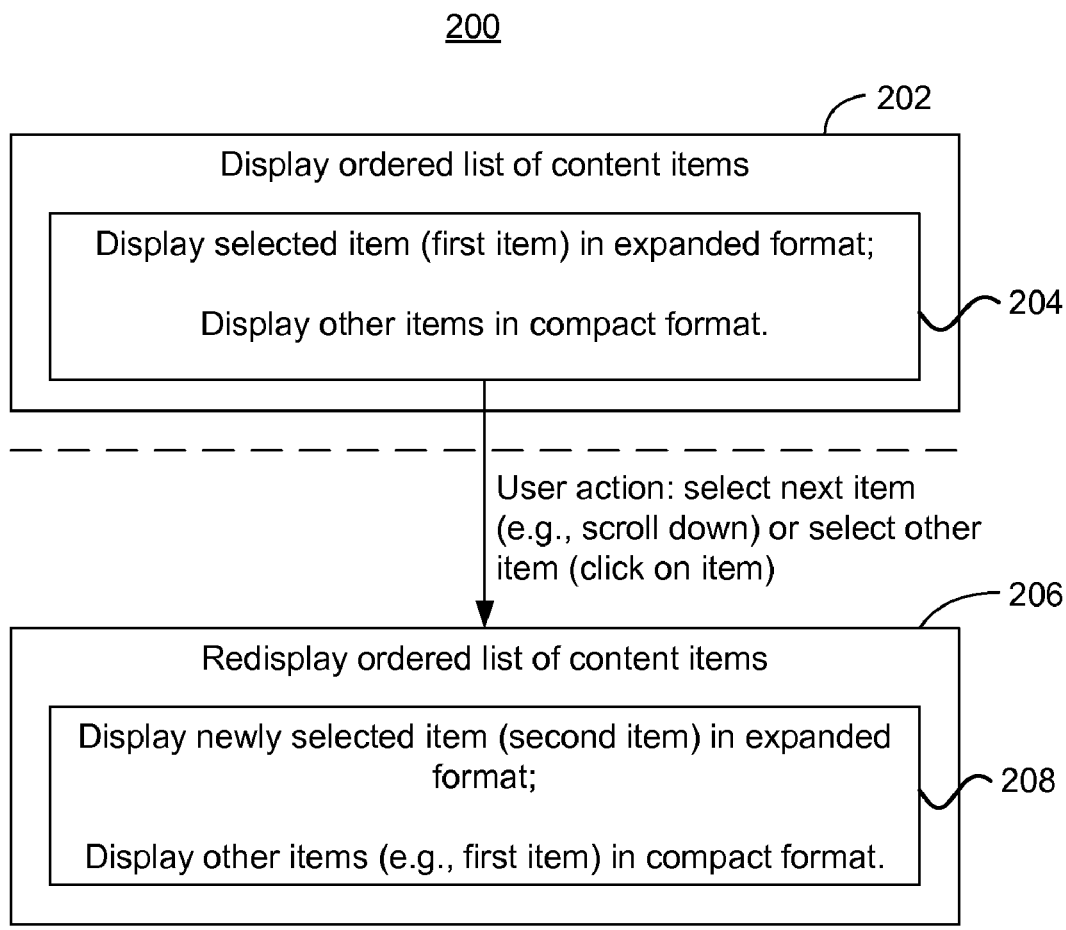
FIGS. 2A-2D are flow diagrams illustrating processes for presenting content items to a user, in accordance with some embodiments.

FIG. 2A is a flow diagram illustrating a process 200 for presenting content items to a user, in accordance with some embodiments. Process 200 occurs at a client device, on a client application that permits the user to interact with server system 104 via feed reader user interface 116. User interface 116 displays an ordered list of content items (202). The content items are specified in content feeds to which the user has subscribed. A selected first item is displayed in expanded format, and other items are displayed in compact format (204). FIG. 3B depicts an exemplary schematic screen shot of a user interface showing a first item, in an ordered list of content items, in expanded format and the other items in a compact format. In one embodiment, the compact format includes the publication source, headline, and timestamp associated with each item, with each item presented in a single line. In another embodiment, the compact format further includes a snippet (a small portion) of the content, also displayed on the single line. In an embodiment, the expanded format displays the same information as the compact format on a first line of the expanded format. In addition, the expanded format displays the title (sometimes called the headline) and source of the content on subsequent lines, in a larger font than the font used on the first line, and displays some or all of the content below the title and source. In other embodiments, the expanded format may include additional information associated with the content item. For example, a content item displayed in the expanded format may include a link to the full content associated with the content item. The link includes the URL of a web page or other document that contains the full content of the content item.

A user may select a next item (second item), for example by scrolling down the list, or may select another item (second item), for example by clicking on it. In response, the ordered list is redisplayed (206). The newly selected second item is displayed in expanded format, while other items, such as the first item, are displayed in compact format (208). FIG. 3C depicts an exemplary schematic screen shot of a user interface showing a second item in expanded format while the first item and other items are displayed in compact format.

Figure 2B:
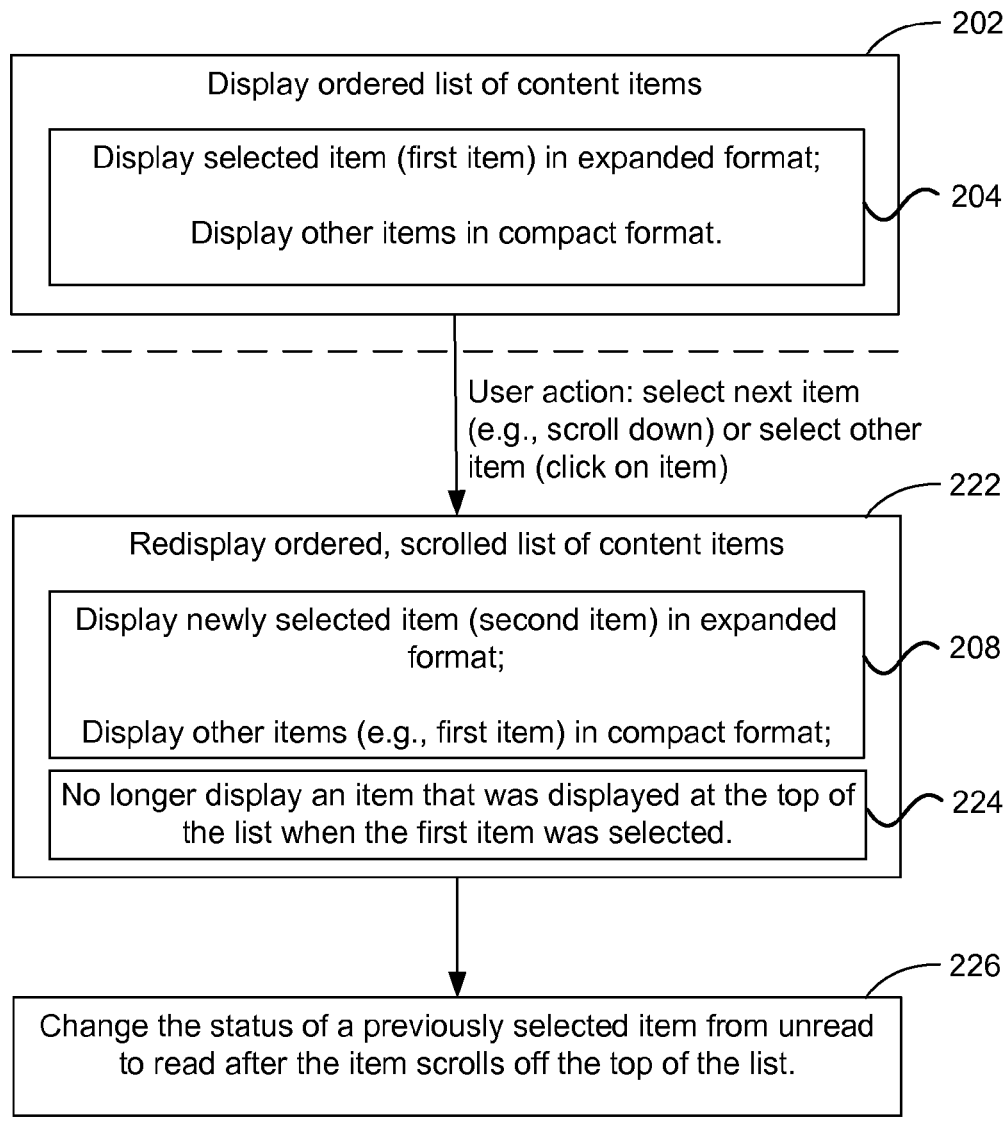

FIG. 2B is a flow diagram illustrating a process 220 for presenting content items to a user, in accordance with some embodiments. An ordered list of contents items is displayed with a selected first item in expanded format and other items in compact format, as described above (202, 204). When a user selects a second item, the ordered list is redisplayed (222). If the user has selected a second item by scrolling down the list, the redisplayed list is scrolled appropriately. The newly selected item is displayed in expanded format, while other items, such as the first item, are displayed in compact format (208). If the user has scrolled down the list, one or more items previously displayed at the top of the list when the first item was selected are no longer displayed (224). In some embodiments, the status of a previously selected item is changed from unread to read when the item scrolls off the top of the displayed list (226). More specifically, when an item that has been viewed in expanded format scrolls off the top of the display list (226), the client sends a message to the server system identifying the content item to be marked as read, and the server system then updates the status of the content item accordingly.

As discussed below with reference to FIG. 2D, in some other embodiments, content items are marked as read when they are displayed in expanded format. Alternatively, content items are marked as read when they are selected, regardless of whether they are displayed in expanded or compact format. Furthermore, in some embodiments, content items that have been marked as read, which have not yet been scrolled off the displayed list, are displayed in a manner that is distinct from the display of unread items. For example, one or more portions of the displayed text (e.g., the displayed title or headline) of items marked as read may be displayed using a light shade of gray while the corresponding text or text portions of unread items may be displayed using black text.

Figure 2C:
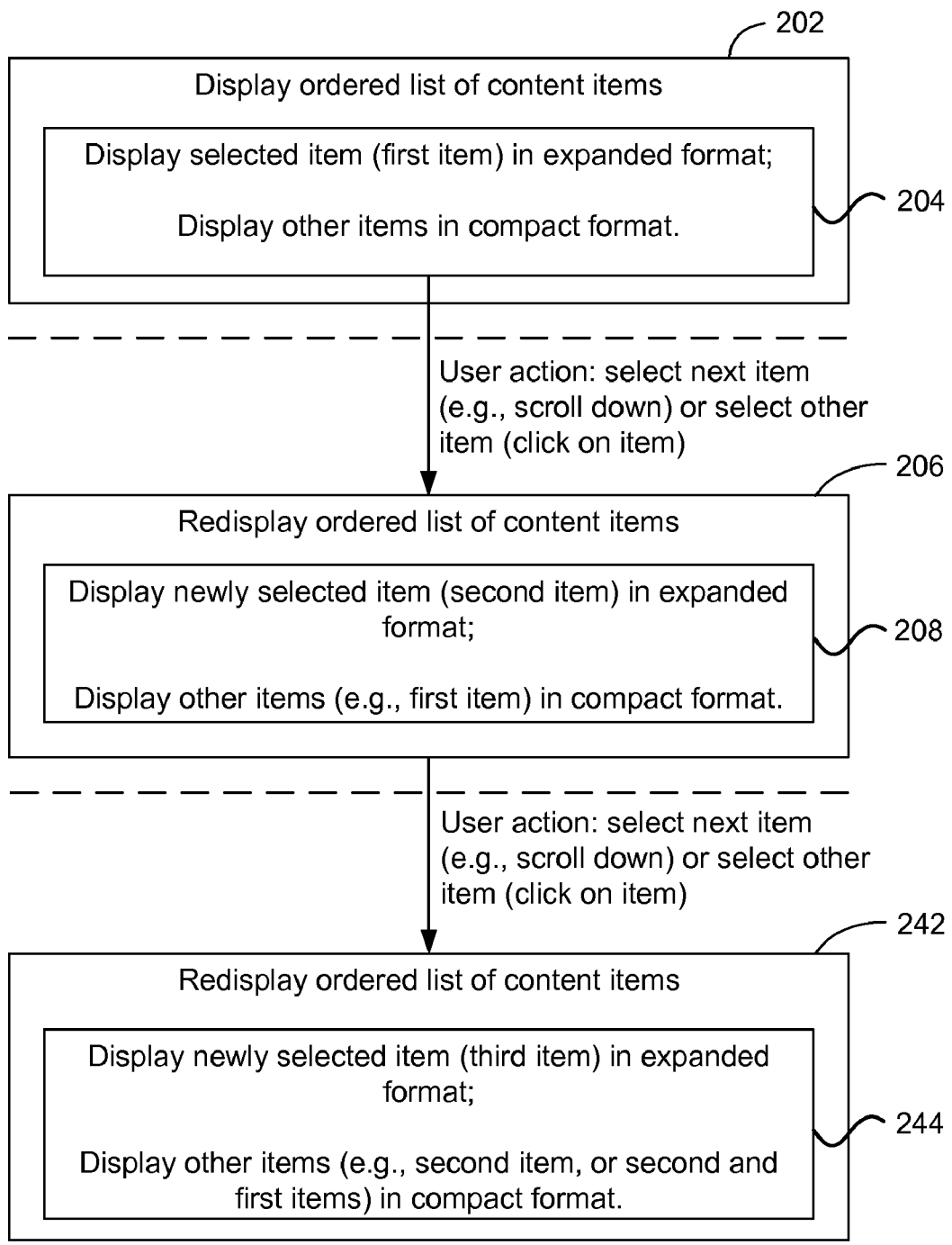

FIG. 2C is a flow diagram illustrating a process 240 for presenting content items to a user, in accordance with some embodiments. Process 240 begins with operations 202-208, described above with regards to FIG. 2A. After operation 208, the displayed ordered list includes a newly selected second item displayed in expanded format and other items, such as the previously selected first item, displayed in compact format. A user may select a next item (third item), for example by scrolling down the list, or may select another item (third item), for example by clicking on another item. In response, the ordered list is redisplayed (242). The newly selected third item is displayed in expanded format, while other items, such as the second and first items, are displayed in compact format (244). However, if the user scrolls through the list to select the third item, the first or second items may not be displayed (e.g., because they have been scrolled off the top or bottom of the displayed list of content items), depending on how far through the list the user scrolls.

Figure 2D:
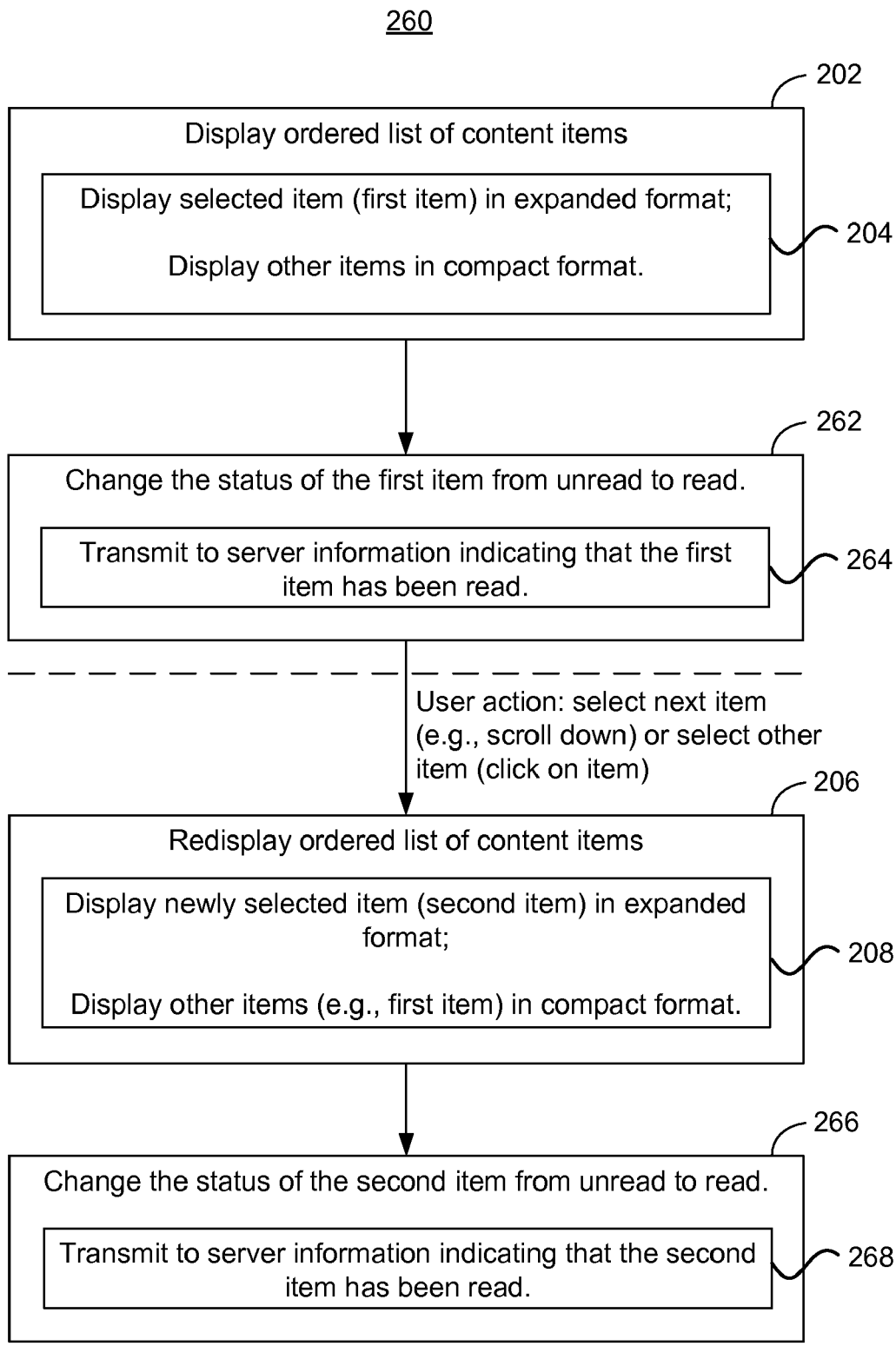

FIG. 2D is a flow diagram illustrating a process 260 for presenting content items to a user, in accordance with some embodiments. Operations 202 and 204 are performed as described above with regards to FIG. 2A. Selection of the first item results in the status of the first item being changed from unread to read (262). In one embodiment, the status is changed by transmitting information to server 108 indicating that the first item has been read (264). Server 108 then updates database 110 to reflect that the first item has been read by the user.

A user may select a next item (second item), for example by scrolling down the list, or may select another item (second item), for example by clicking on another item. In response, the ordered list is redisplayed (206). The newly selected second item is displayed in expanded format, while other items, such as the first item, are displayed in compact format (208). Selection of the second item results in the status of the second item being changed from unread to read (266). In one embodiment, the status is changed by transmitting information to server 108 indicating that the second item has been read (268). Server 108 then updates database 110 to reflect that the second item has been read by the user.

Figure 3A:
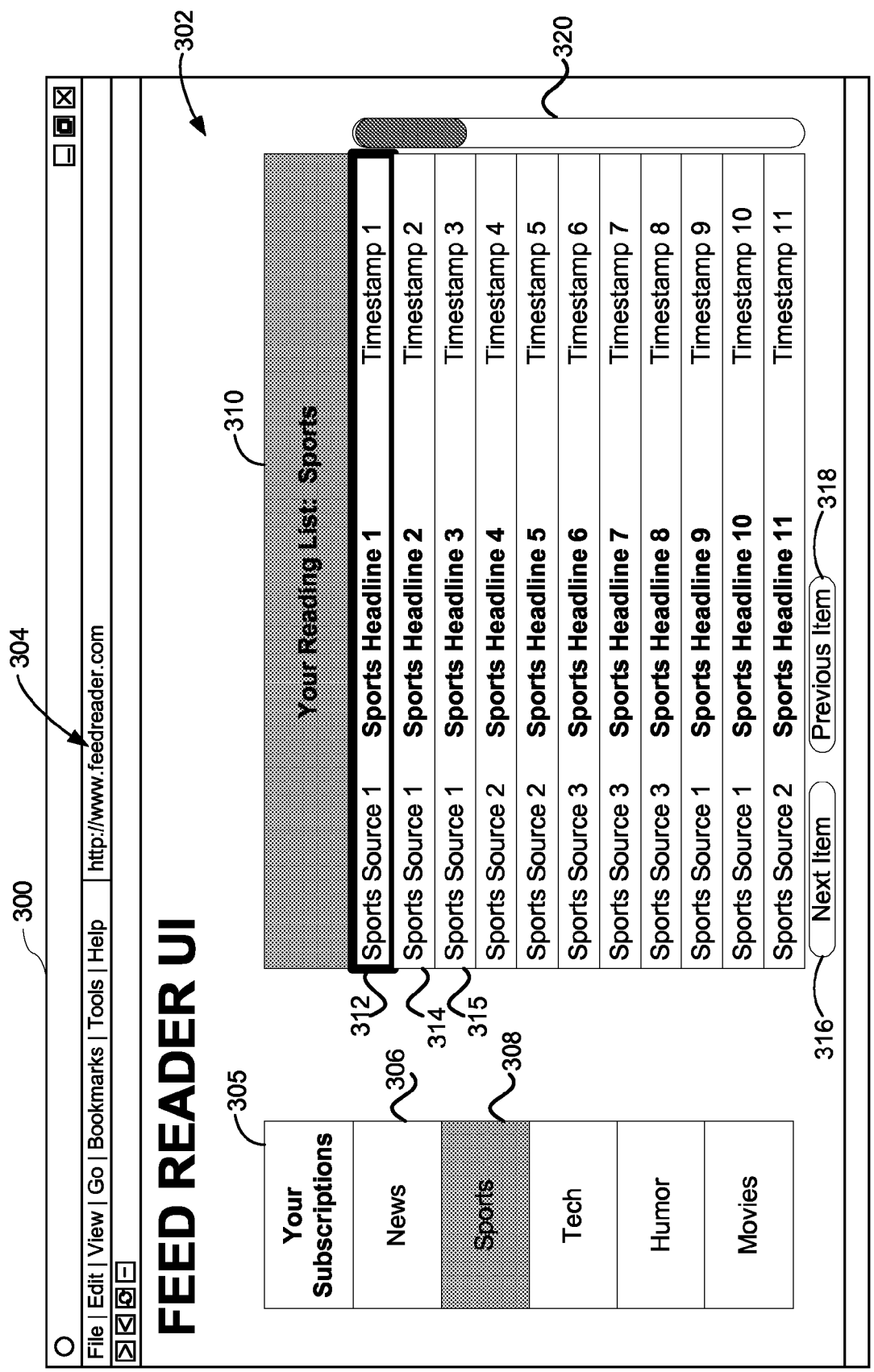
FIGS. 3A-3D are schematic screenshots of the user interface of a content feed reader in accordance with some embodiments.
Figure 3B:
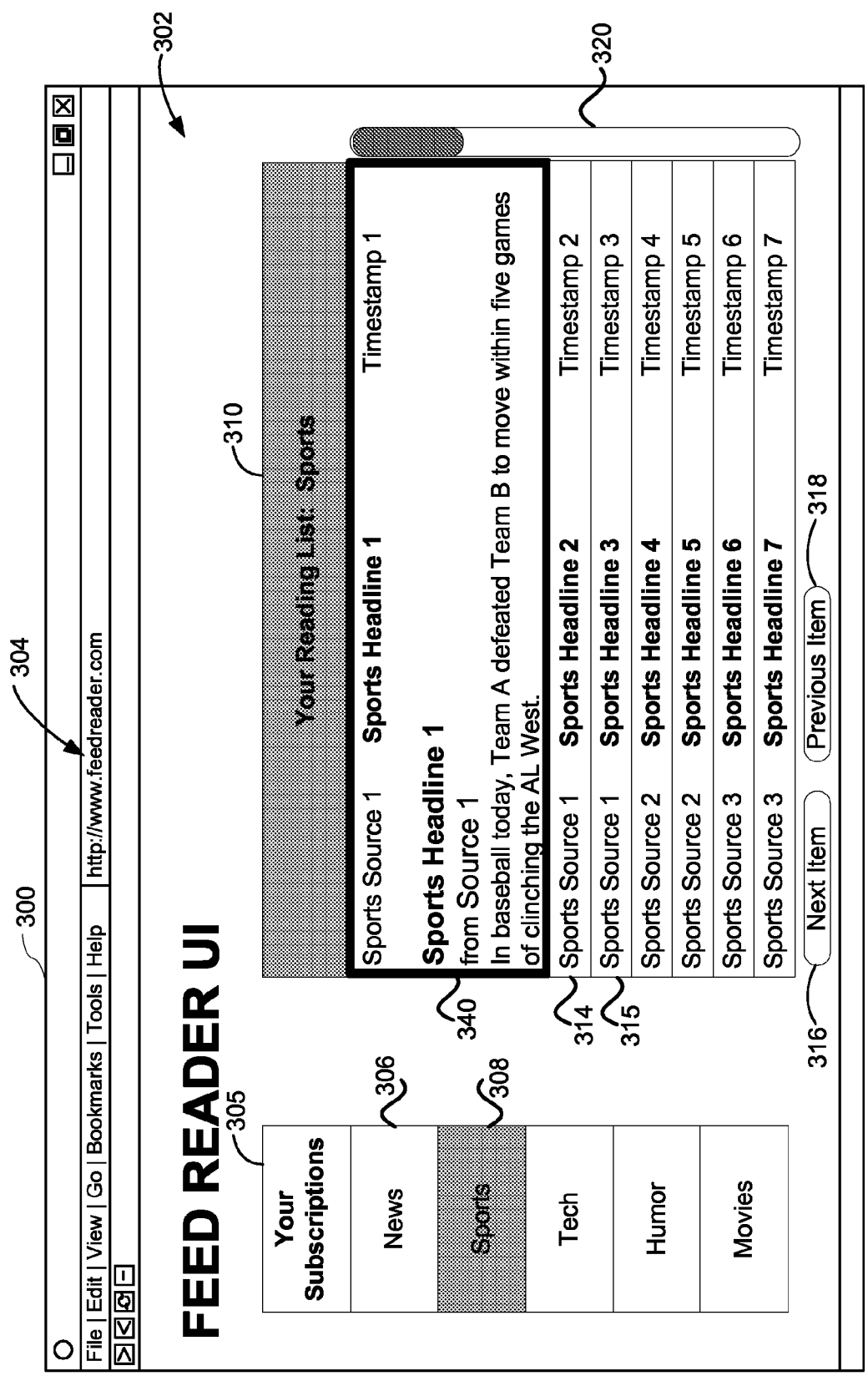
Figure 3C:
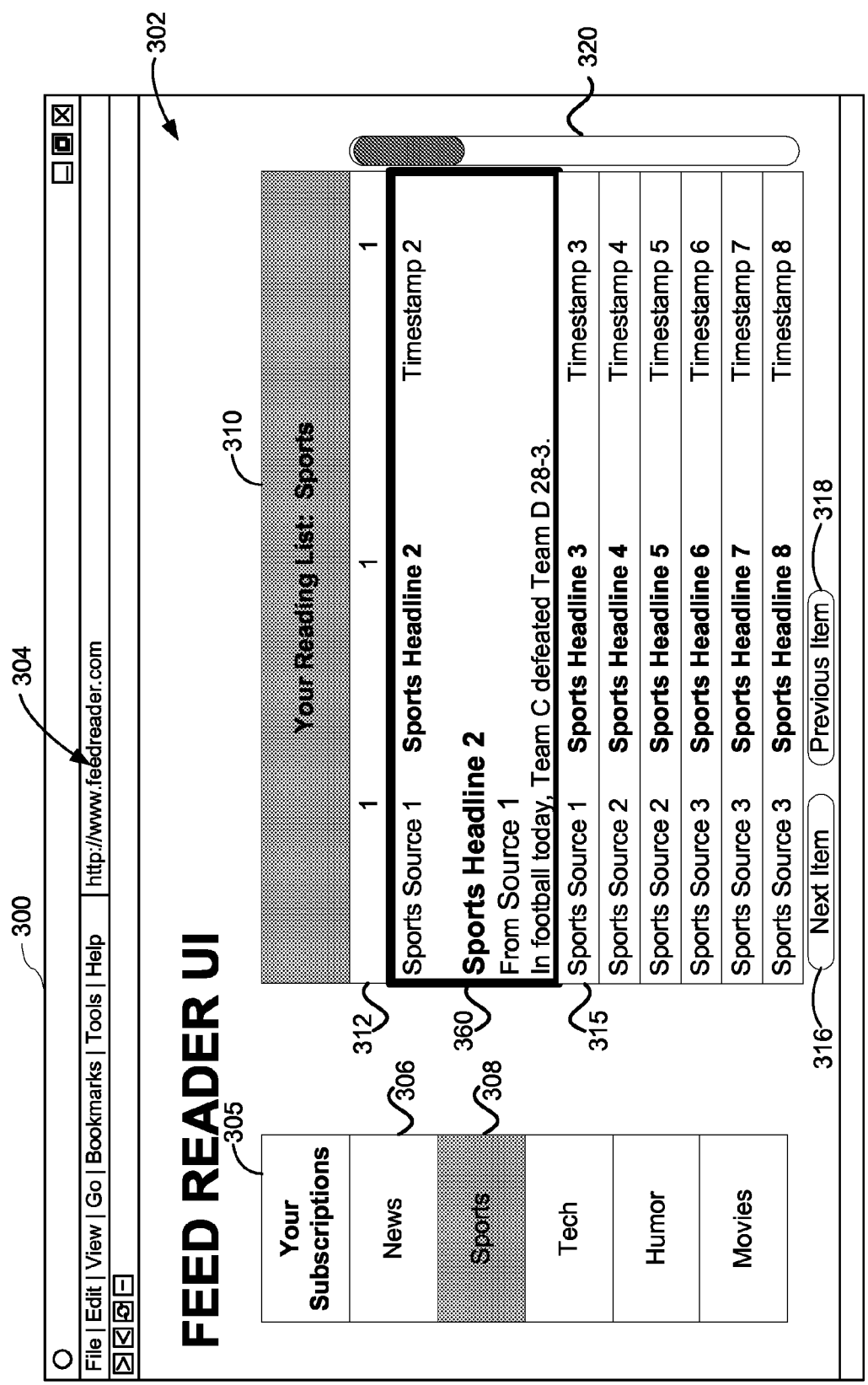

FIG. 3A is a schematic screenshot of a web browser's user interface 300 (sometimes hereinafter called the web browser for convenience), presenting a web page that displays a feed reader user interface 302, in accordance with some embodiments. The web browser 300 can be any type of browser application that permits a user to display and interact with web pages or other documents or information. The web browser's user interface includes a URL field 304 for entering the URL of any web page that a user wants to display, as well as for displaying the URL of the web page currently being displayed. The user may access a web page displaying a feed reader's user interface 302 by entering in the URL field 304 the URL associated with feed reader user interface 302.

Feed reader user interface 302 includes a list 305 of labels, also referred to as folders, associated with content feeds to which a user has subscribed. Exemplary labels shown in FIG. 3A include "News" 306 and "Sports" 308. The labels or folder names may be user defined names. User interface 302 also includes an ordered list 310 of content items associated with a selected label. For example, in FIG. 3A, the "Sports" label 308 has been selected by the user, as indicated by a shaded background. In this example, ordered list 310 includes items 312, 314, and 315. In some embodiments, items in ordered list 310 are ordered according to timestamps associated with the items. In some other embodiments, items in ordered list 310 are ordered in accordance with a score that takes into account both the content of the items and the timestamps of the items.

A user may select a different label, for example by clicking on a different label. If a user selected the "News" label 306, ordered list 310 would display content items associated with "News" label 306. Also, user interface 302 would indicate that the "News" label 306 was selected by displaying it with a shaded background. In this example, the background for "Sports" label 308 would no longer be shaded after the user selected "News" label 306.

In FIG. 3A, all items in ordered list 310, including items 312, 314, and 315, are displayed in compact format. In this embodiment, compact format includes the source, headline, and timestamp for each item, displayed in a single line. For example, the compact format display for item 312 includes "Sports Source 1," "Sports Headline 1," and "Timestamp 1," all displayed on the same line of ordered list 310. In other embodiments, compact format might include additional information. For example, a brief portion of the content could be displayed next to the headline.

User interface 302 shows that an item in ordered list 310 is selected by displaying that item with a bold border. In FIG. 3A, item 312 is selected, as indicated by its bold border. Items 314 and 315 are not selected, as indicated by their narrow borders. In other embodiments, a selected item may have a border with a different color from that of other items (e.g., a thick blue border for the selected item and a gray or thin black border for the unselected items). A user may select another item (second item) by clicking on "Next Item" button 316 or "Previous Item" button 318, by clicking directly on another item, or by scrolling through ordered list 310 using scrollbar 320 and then clicking on another item. For example, in FIG. 3A, a user could select item 314 by clicking "Next Item" button 316 or by clicking directly on item 314. Item 314 then would be displayed with a bold border, and other items, such as item 312, would appear with narrow borders.

FIG. 3B is a schematic screenshot of a web browser 300 presenting a web page that displays a feed reader user interface 302, in accordance with some embodiments. As in FIG. 3A, user interface 302 includes a list 305 of labels associated with content feeds to which a user has subscribed and an ordered list 310 of content items associated with a selected label. However, a selected content item 340 is displayed in expanded format, while other content items, such as a second item 314, are displayed in compact format. Item 340 corresponds to item 312 displayed in compact format in FIG. 3A. In an embodiment, the expanded format displays the same information as the compact format on a first line, such as the source, headline, and timestamp for each item. The headline then is displayed again in larger type on a second line, the source is displayed again on a third line, and the content is displayed on a fourth and subsequent lines as necessary. This embodiment of expanded format is illustrated by content item 340. In a different embodiment, the expanded format does not display the same information as the compact format on a first line; instead, it displays the headline and source in larger type than in the compact format, followed by the content on subsequent lines.

As discussed above in regards to FIG. 3A, a user may select another item (second item). For example, in FIG. 3B, the user might select item 314, by clicking on item 314 or by clicking "Next Item" button 316. FIG. 3C, a schematic screenshot of a web browser 300 presenting a web page that displays a feed reader user interface 302, shows the result of this user action according to an embodiment. The selected item 360 (corresponding to item 314 in compact format) appears in expanded format. Other items, including first item 312 (corresponding to item 340 in expanded format) are displayed in compact format.

In the example of FIGS. 3B and 3C, item 360 is not as large as item 340: it has only one line of content as opposed to two. Therefore, the ordered list 310 in FIG. 3B displays fewer items than the ordered list 310 in FIG. 3C: ordered list 310 in FIG. 3B displays seven items, while ordered list 310 in FIG. 3C displays eight items. In general, the number of items displayed in ordered list 310 will vary depending on the size in expanded format of the selected item.

Figure 3D:
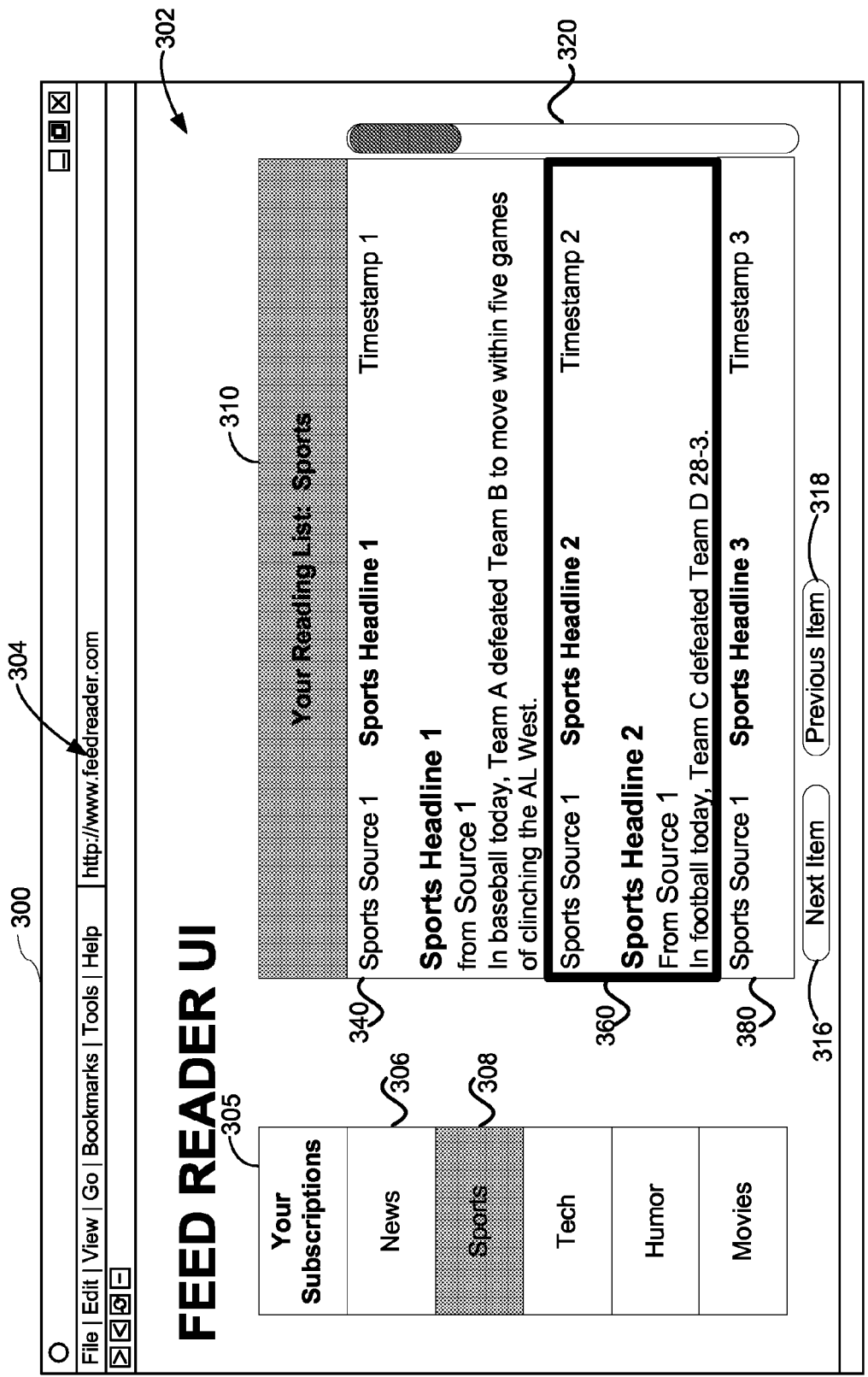

FIG. 3D is a schematic screenshot of a web browser 300 presenting a web page that displays a feed reader user interface 302, in accordance with some embodiments. As in FIGS. 3A-3C, user interface 302 includes a list 305 of labels associated with content feeds to which a user has subscribed and an ordered list 310 of content items associated with a selected label. However, all items in ordered list 310 are displayed in expanded format. Items 340 and 360 (corresponding respectively to items 312 and 314 in compact format) are displayed in their entirety. Only the top portion of item 380 (corresponding to item 315 in compact format) is displayed, because there is not enough space to display the entire item in expanded format. Because the size of each item in expanded format varies, depending for example on the amount of content, the number of displayed items will vary in general.

Some, but not necessarily all, content items displayed in expanded format include a link to the full content associated with those content items. The link may be activated by a user clicking on the headline in the content item, or by clicking on a link icon (not shown in FIGS. 3A-3D) displayed in the expanded format of a respective content item. Activation of the link typically causes the browser to open a new browser window or tab and to download and display the document (if any) located at the location (e.g., URL) specified by the link.

Although not shown in FIGS. 3A-3D, the feed reader user interface will typically include icons, menu items or the like for reviewing and managing the user's content feed subscriptions, including removing and adding content feed subscriptions, and optionally labeling a respective content feed subscription with one or more user defined labels (or, alternately, assigning the respective content feed subscription to one or more user defined folders).

Figure 4:
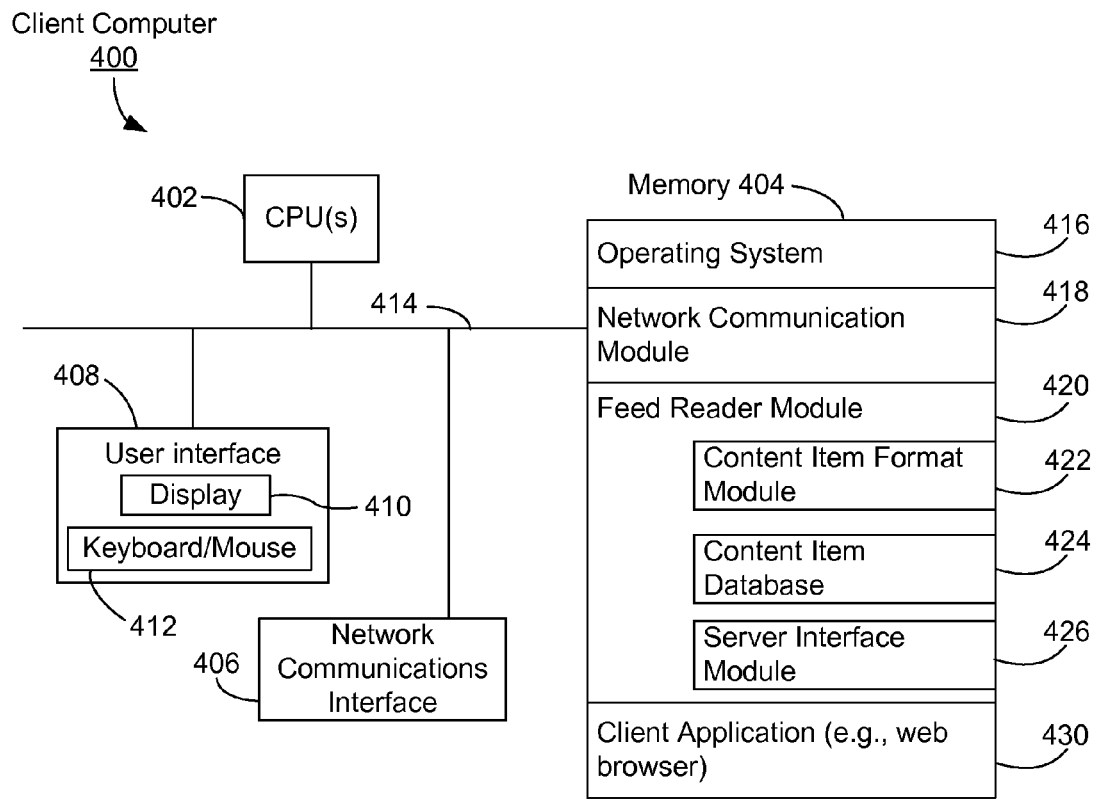
FIG. 4 is a block diagram illustrating a client computer in accordance with some embodiments.

FIG. 4 is a block diagram illustrating a client computer in accordance with some embodiments. The client computer 400 typically includes one or more processing units (CPU's) 402, one or more network or other communications interfaces 406, memory 404, and one or more communication buses 414 for interconnecting these components. The communication buses 414 may include circuitry (sometimes called a chipset) that interconnects and controls communications between system components. The client computer 400 may also include a user interface 408 comprising a display device 410 and a keyboard and/or mouse (or other pointing device) 412. Memory 404 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 404 may optionally include one or more storage devices remotely located from the CPU(s) 402. In some embodiments, memory 404 stores the following programs, modules and data structures, or a subset thereof:

- an operating system 416 that includes procedures for handling various basic system services and for performing hardware dependent tasks;
- a network communication module 418 that is used for connecting the client system 400 to other computers via the one or more communication network interfaces 406 and one or more communication networks, such as the Internet, other wide area networks, local area networks, metropolitan area networks, and so on;
- a feed reader module 420 for handling content items from content feeds; and
- a client application 430, such as a web browser.

The feed reader module 420 includes a content item format module 422 for determining the format in which to display content items, a local database 424 for storing content items sent by the server, and a server interface module 426 for interfacing with server computer 500.

In some embodiments, the feed reader module 420 may be a script-based module, embedded in a web page served from the server system 104 (FIG. 1). The web page may be rendered by a client application 430, such as a web browser, at the client computer 400. When the web page is rendered, the feed reader module 420 is executed, thereby providing a web-based interface to the server system 104. The script-based feed reader module may be written in JavaScript, ECMAScript or any other suitable scripting language.

In some other embodiments, the feed reader module 420 may be a standalone application stored in memory 404 of the client computer 400. The standalone application may include, but is not limited to a feed aggregator application. In further other embodiments, the feed reader module 420 may be an add-on or a plug-in to another application. For, example, the feed reader module 420 may be a plug-in or extension to a web browser application or an email application.

In some embodiments, received content items may be cached locally in memory 404. Similarly, a user's list of content feed subscriptions may also be cached locally in memory 404.

Each of the above identified elements in FIG. 4 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 404 may store a subset of the modules and data structures identified above. Furthermore, memory 404 may store additional modules and data structures not described above.

Figure 5:
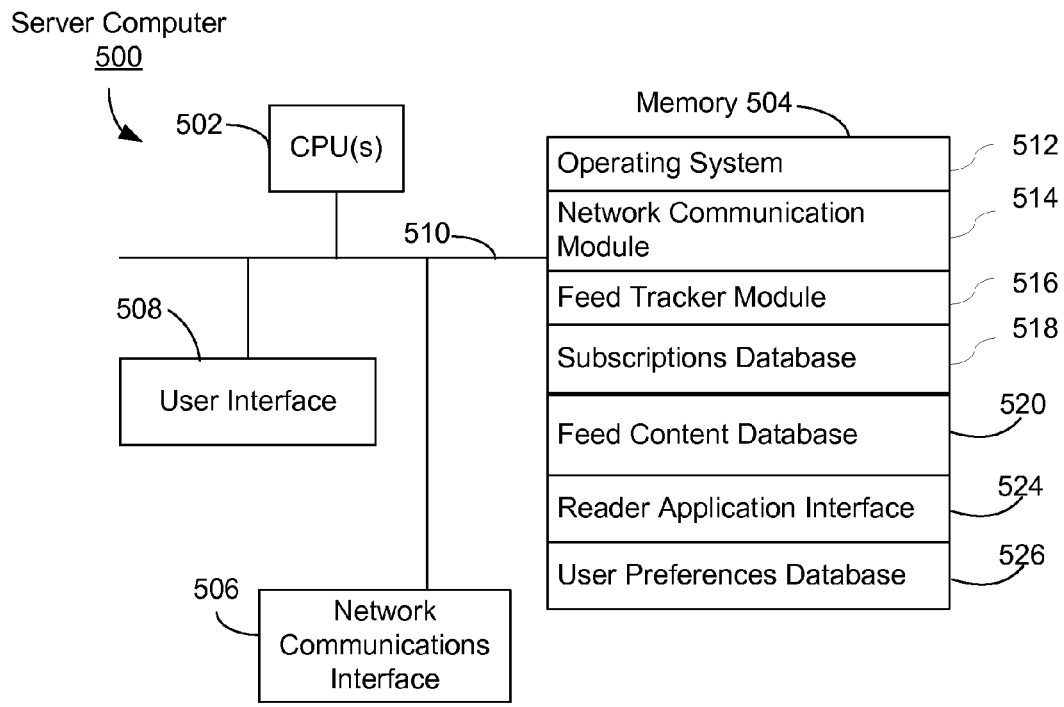
FIG. 5 is a block diagram illustrating a server computer in accordance with some embodiments.

FIG. 5 is a block diagram illustrating a server computer 500 in accordance with some embodiments. The server computer 500 typically includes one or more processing units (CPU's) 502, one or more network or other communications interfaces 506, memory 504, and one or more communication buses 510 for interconnecting these components. The communication buses 510 may include circuitry (sometimes called a chipset) that interconnects and controls communications between system components. The server system 500 optionally may include a user interface 508, which may include a display device (not shown), and a keyboard and/or a mouse (not shown). Memory 504 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 504 may optionally include one or more storage devices remotely located from the CPU(s) 502. In some embodiments, memory 504 stores the following programs, modules and data structures, or a subset thereof:

- an operating system 512 that includes procedures for handling various basic system services and for performing hardware dependent tasks;
- a network communication module 514 that is used for connecting the server system 500 to other computers via the one or more communication network interfaces 506 and one or more communication networks, such as the Internet, other wide area networks, local area networks, metropolitan area networks, and so on;
- a feed tracker module 516 for retrieving content items for storage periodically and/or as content feeds are updated;
- a subscriptions database 518 for storing information about the content feed subscriptions of users of the system;
- a feed content database 520, for storing content items from content feeds and user information about content items that respective users have read, labeled, and so on;
- a reader application interface 524 for exchanging information with the feed reader modules in one or more client computers; and
- a user preferences database 526 for storing user-specific information, including user preferences with regard to the user interface.

Each of the above identified elements in FIG. 5 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 504 may store a subset of the modules and data structures identified above. Furthermore, memory 504 may store additional modules and data structures not described above.

Although FIG. 5 shows a "server computer," FIG. 5 is intended more as a functional description of the various features which may be present in a set of servers than as a structural schematic of the embodiments described herein. In practice, and as recognized by those of ordinary skill in the art, items shown separately could be combined and some items could be separated. For example, some items shown separately in FIG. 5 could be implemented on single servers and single items could be implemented by one or more servers.

Figure 6A:
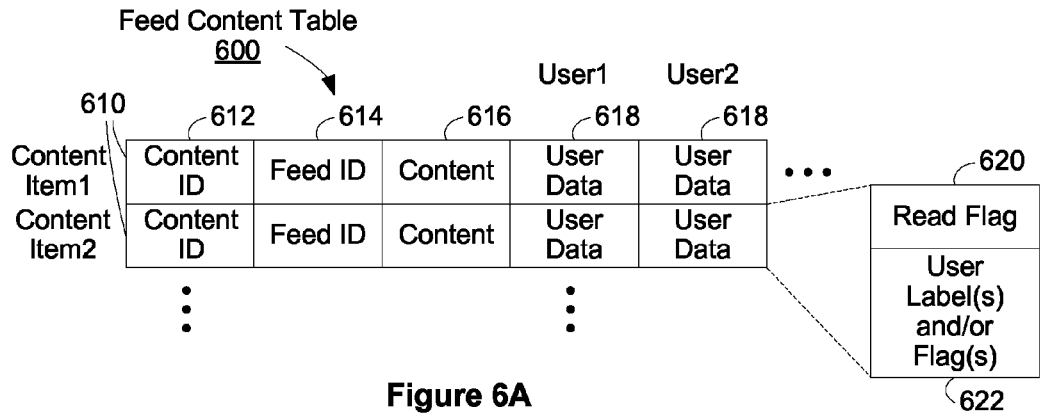
FIGS. 6A, 6B and 6C are diagrams illustrating data structures for feed content items and user subscriptions, in accordance with some embodiments.

FIG. 6A is a diagram illustrating a data structure for feed content items, in accordance with some embodiments. As described above, a server computer 500 (FIG. 5) may store a plurality of feed content items in feed content database 520. The feed content items may be stored in a data structure, such as a table data structure 600. The feed content table 600 includes a row 610 for each content item from each feed source. Each row includes one or more fields (612, 614) that identify the content item, such as a content ID 612 and a feed ID 614 (which identifies the feed source of the content item). In some embodiments, the content ID may include information that uniquely identifies the feed source, in which case the feed ID 614 may be omitted. Each row 610 may further include content 616 of the content item. The content 616 may include the metadata of the content item (e.g., title, description, URL, date/time, and possibly other metadata), and may further include the actual content of the content item. In addition, each row 610 includes a column 618 or field for each registered user of the system. The user data in this column may include a read flag 620, which indicates whether the user corresponding to this column has read the content item associated with the row 610 containing the user data. The user data in column 618 also may optionally include additional user information, such as one or more user specified labels or flags 622. A user may tag or label content items, as well as content feeds, and a record of the tag or label that the user associated with each labeled content item is stored in the user data 618. In some embodiments, the system may allow users to tag or label individual content items with predefined tags or labels (e.g., star, red, blue, etc.), and some embodiments further allow users to tag or label individual content items with user-defined labels (e.g., "news," "music," etc.). Furthermore, a content item, represented by a row 610, may by tagged by any number of users.

Figure 6B:
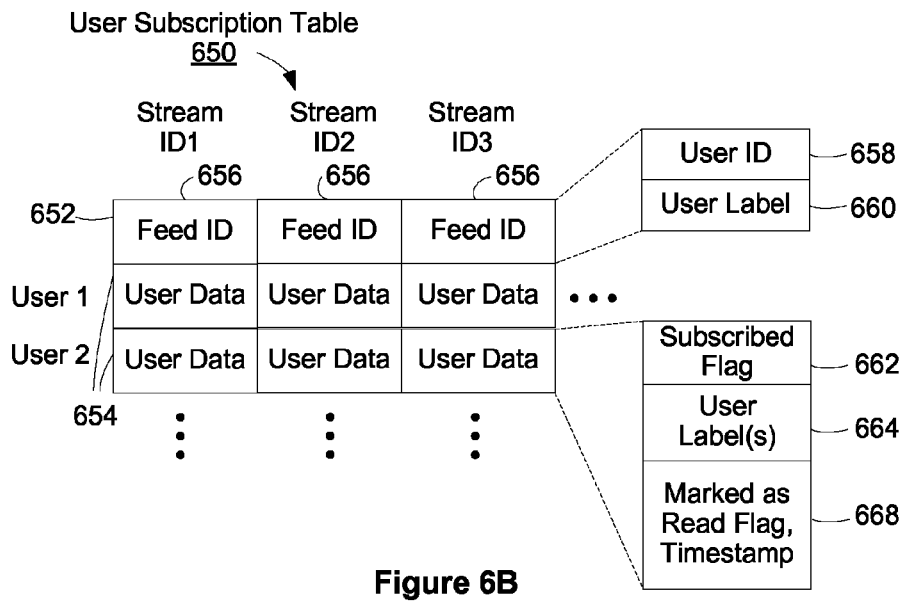

FIG. 6B is a diagram illustrating a data structure for user subscriptions, in accordance with some embodiments. As described above, a server computer 500 (FIG. 5) may store user subscription information in subscriptions database 518. The user subscription information may be stored in a data structure, such as a table data structure 650. A user subscription information table 650 stores feed identifications for feed streams known to the system and user data for those feed streams. The user subscription table 650 includes fields or columns 656 corresponding to the stream ID's for each content stream known to the system, including both real content streams (typically corresponding to content streams from publication sources at well defined network locations) and virtual content streams. A virtual content stream is a content stream derived from one or more other content streams within the context of the server system 104. For example, a virtual content stream may include a set of real content streams assigned a label by a user. In another example, a virtual stream may include individual content items assigned a particular label by a user; the labeled content items may be from one or more real content streams. In one embodiment, a virtual stream can be identified by the user who created the stream and the user label assigned to the virtual stream by the user.

Thus, the stream ID of a virtual stream may include the user ID 658 of the user who created the virtual stream and the user label 660 assigned to the virtual stream by that user. Alternately, the stream ID of a virtual stream may be generated or assigned by a mapping function that maps virtual streams to virtual stream IDs.

Table 650 further includes a row 654 for each user, with fields or columns 656 containing user data for each content stream. In some embodiments, the user data for a respective content stream includes a subscribed flag 662 indicating whether the user has subscribed to the content stream associated with the column 656 containing the user data. The user data may also include a marked-as-read flag and timestamp 668, which indicates whether and when the user corresponding to the row has viewed the items in the content stream associated with the column 656. The user data may further include additional user information, such as one or more user specified labels 664. A user may label content streams that the user may want to view again in the future, and a record of the label that the user associated with a content stream may be stored in the user data 656.

Figure 6C:
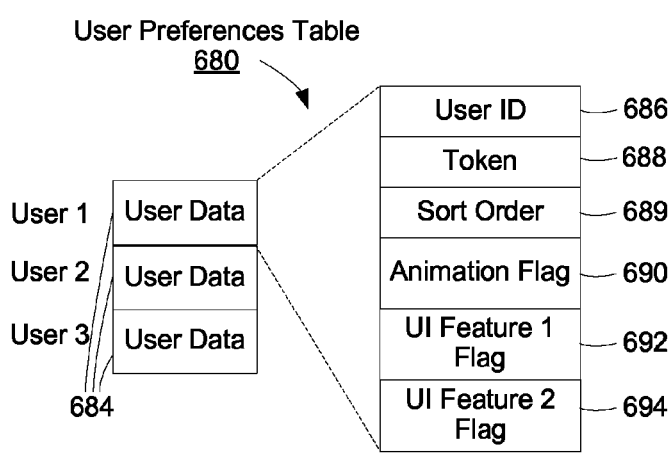

FIG. 6C is a diagram illustrating a data structure for user preferences, in accordance with some embodiments. As described above, a server computer 500 (FIG. 5) may store user preference information in user preferences database 526. The user preference information may be stored in a data structure, such as a table data structure 680. User preferences table 680 contains user data 684 (e.g., in a row or record of the table 680) for each user. The user data 684 optionally includes a user ID 686 (which may be implied by the location of the user data 684 in the user preferences table 680), and a token 688 used by server 500 to authenticate requests from the user. In some embodiments, the token 688 is generated using a random or pseudo-random number generator or function, and is of sufficient length that it would be impractical to guess or independently replicate the token. In some embodiments, users who have not implemented the bookmark feature discussed below are not assigned a token 688. Instead, a respective token 688 is generated and stored in the user data 684 of a user when the user first implements the bookmark feature. As described in more detail below, the token is used in the bookmark feature to prevent interlopers from forging a user's feed reader bookmark(s) (sometimes herein called a content feed bookmark), which would enable unauthorized access to a user's feed reader account, and which in turn would result in content items being marked as read even though they had never been seen by the user.

The user data optionally may include one or more additional fields 689, 690, 692, 694. For example, the user data optionally may include a sort order flag 689, for specifying the order in which to display content items on a user interface, such as user interface 302 (FIG. 3A). For example, content items may be displayed in chronological order or according to a ranking based on predefined criteria (e.g., the quantity and/or quality of the content in the content items, as well as the recency of the content items). The user data may further include an animation flag 690 to indicate whether or not to display animations on the user interface. The user data may include user interface feature flags or parameter values (692, 694) to specify other user interface characteristics associated with the user. For example, user interface feature flags may be used to specify the formatting and color of a user interface. In an embodiment, users may set the sort order flag, the animation flag and user interface feature flags via menus accessible from the user interface (not shown).

The feed content table 600 and user subscription table 650, or portions of these tables, may be stored using sparse table storage mechanisms, since large portions of the user data in these tables may be empty or set to default values.

Figure 7A:
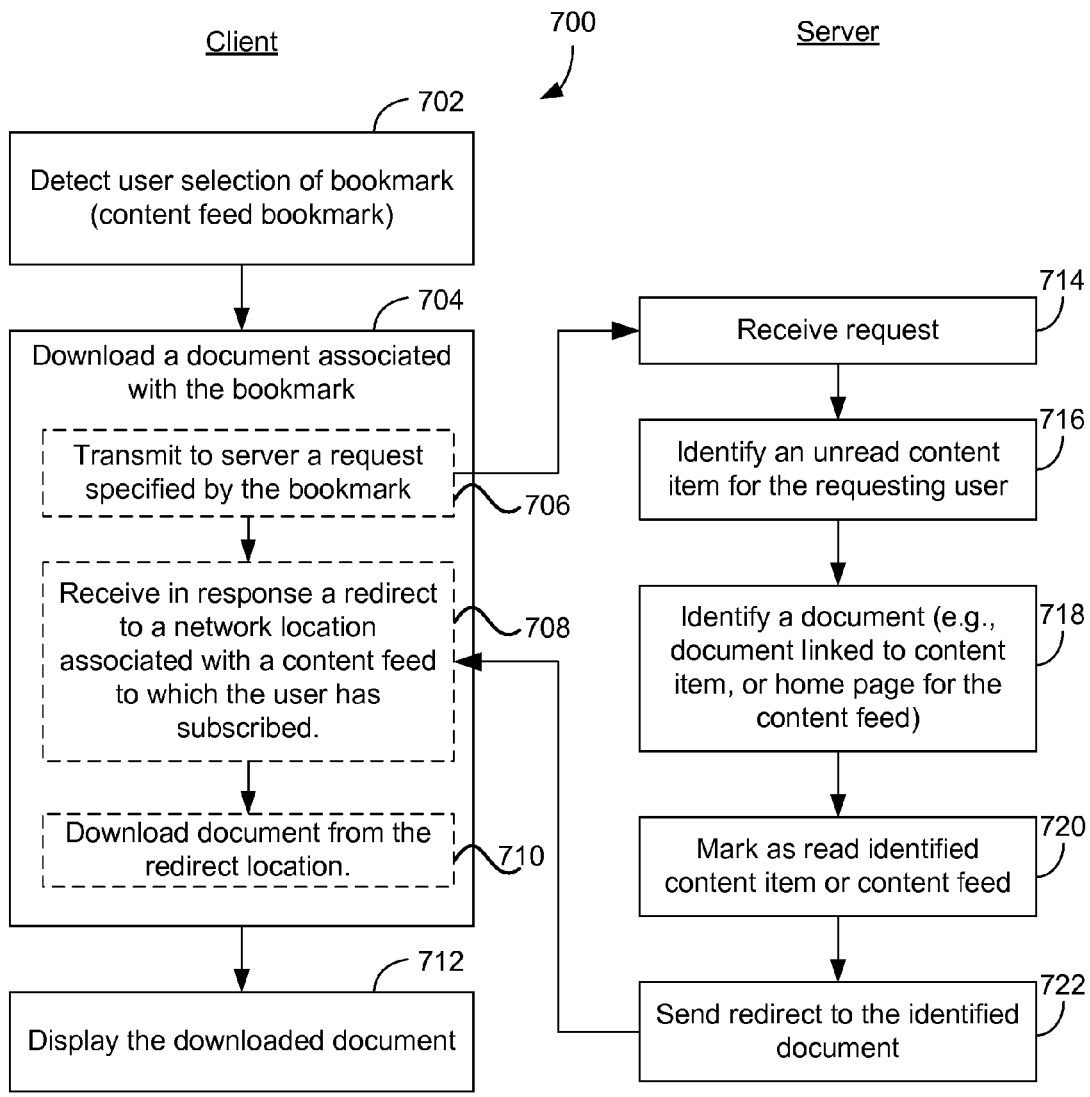
FIGS. 7A, 7B and 7C are flow diagrams illustrating a process for presenting content items to a user, in accordance with some embodiments.

FIG. 7A is a flow diagram illustrating a process 700 for presenting content items to a user, in accordance with some embodiments. Operations 702-712 are performed by client computer 400, while operations 714-722 are performed by server computer 500. Client 400 detects user selection of a bookmark (sometimes herein called a feed reader bookmark or content feed bookmark) (702). In response, client 400 downloads a document associated with the bookmark (704) and displays the downloaded document to the user (712).

In one embodiment, the process of downloading the document begins with transmitting to server 500 a request specified by the bookmark (706). As discussed in more detail below, in some embodiments, if the request is a valid request, it includes a token that uniquely corresponds to the user identifier of the requesting user, and a login cookie (also variously called an object, cookie file or cookie object) containing the requesting user's user identifier (sometimes called the user ID). Server 500 receives the request (714), identifies the user or user account of the user, and identifies an unread content item for the requesting user (716). Typically, in order for the server to successfully process the user's request, the requesting user must be a registered user of the content feed aggregation system, and must have subscribed to at least one content feed. The item identified by the server may, for example, be the most recent unread item in a set of content feeds associated with the selected bookmark. In another example, an unread item is identified according to other predefined selection criteria.

A document associated with the identified item is identified (718). Exemplary identified documents include a document corresponding to a URL in the identified content item, or the home page of a content feed containing the identified content item. For example, if the identified item is a blog posting, the identified document could be a web page containing the posting, or it may be the home page of the blog. If the identified item is a news article, the identified document could be a web page containing the article, or it may be the home page of a news service that published the article.

Server 500 marks the identified content item or a corresponding feed stream as read (720). In one embodiment, when the document identified in operation 718 is linked to a specific content item, the specific content item is marked as read. On the other hand, when the document identified in operation 718 is a home page for a content feed, the corresponding feed stream is marked as read, with a timestamp indicating the last time that the feed stream was marked as read. Marking an entire feed stream as read is equivalent (from the user's perspective) to marking all content items in the feed stream as having been read by the user, but is much more efficient because the only update made to the server's database is to update the "marked-as-read" flag and timestamp 668 in the user data for the feed stream (in the user subscription table 650). In contrast, marking as read all the individual items in the feed stream would potentially require updating the user data for many items in the feed content table 600. Once a feed stream has been marked as read for a particular user, only content items that are newer than the marked-as-read timestamp can be considered to be unread by the user (excluding, of course, any individual content items that have been marked as read).

Server 500 then sends client 400 a redirect to the identified document, or more specifically, to a network location associated with the document (722). Client 400 receives the redirect (708) and downloads the identified document from the redirect location (710). The downloaded document is displayed to the user (712).

Figure 7B:
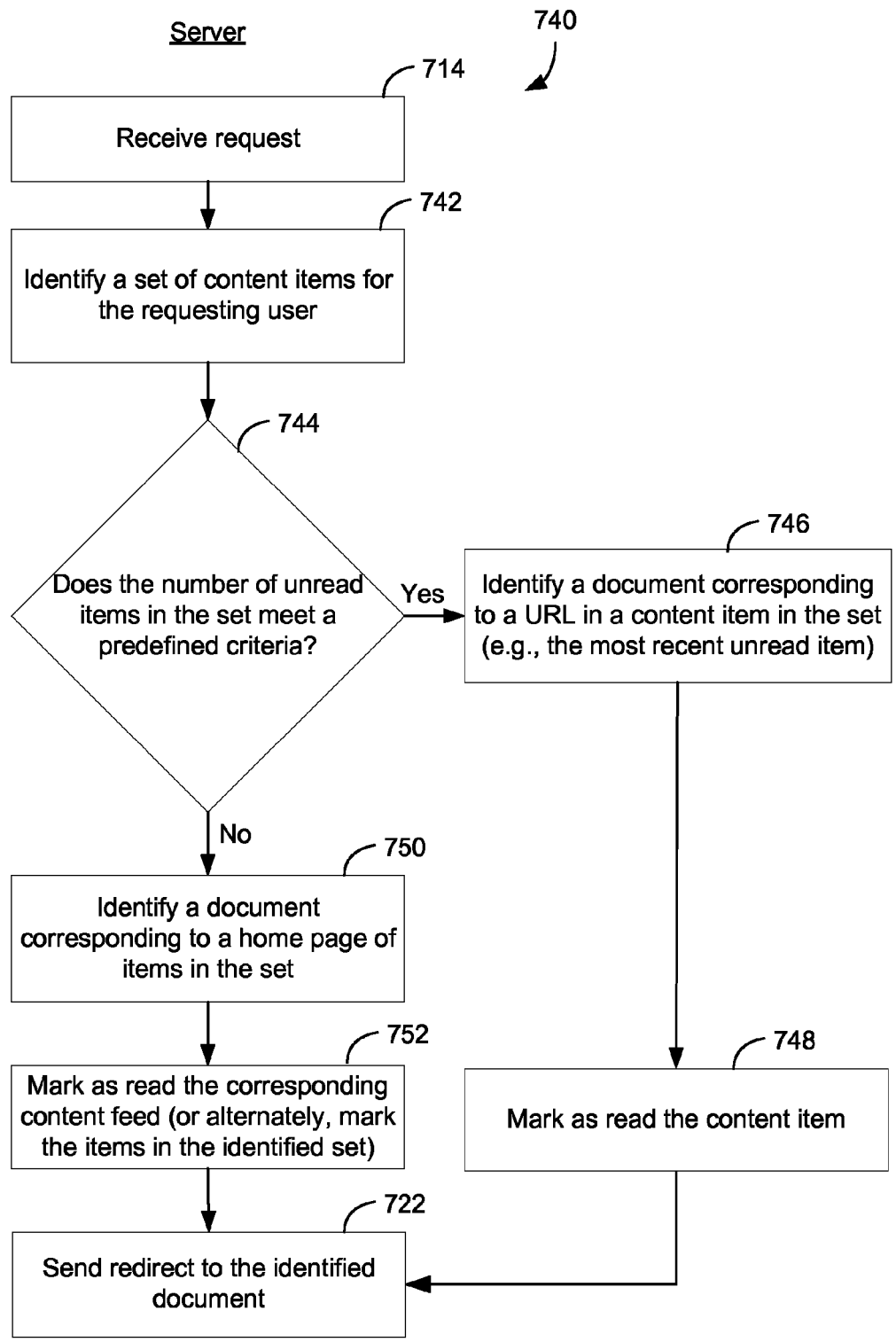

FIG. 7B is a flow diagram illustrating a process 740, performed by server computer 500, for identifying content to provide to a user, in response to user selection of a bookmark. For example, user selection of the bookmark may cause an HTTP request to be sent to the server and the URL may include one or more parameters. Server 500 receives a request specified by the bookmark (714). A set of content items associated with the bookmark request is identified (742). For example, the identified set of items could include items associated with a content feed to which the user has subscribed.

During operation 744, the number of unread items in the identified set of items is tested against predefined criteria. If the number of unread items meets the predefined criteria, a document corresponding to a URL in a content item in the set is identified (746). The item corresponding to the identified document is marked as read (748), and a redirect to the identified document is sent to client computer 400 (722). However, if the number of unread items does not meet the predefined criteria, a document corresponding to a home page of unread items in the set is identified (750). In addition, the content feed corresponding to the unread items is marked as read (752), and a redirect to the identified document is sent to the client computer (722). Alternately, all unread items in the set associated with the home page are marked as read (752), and a redirect to the identified document is sent to the client computer (722).

For example, consider a situation in which the most recent unread item from all the content feeds to which a user subscribes is a news article from a particular news provider. In response to user selection of a bookmark, server 500 receives a request specified by the bookmark (714) and identifies a set of items comprising the most recent unread item (the news article) and all other items provided by the same particular news provider (742). Now consider that the predefined criteria is whether the number or unread items in the set is less than ten. If the user's feed has less than ten unread items from the particular news provider, a web page containing the most recent unread item (the news article) will be identified (746), the item will be marked as read (748), and a redirect to the web page will be sent to client 400 (722). However, if the user's feed has ten or more unread items, a home page for the particular news provider will be identified (750), the feed stream associated with the particular news provider will be marked as read (752) (or, alternately, all the unread items in the feed stream will be marked as read), and a redirect to the home page will be sent to client 400 (722).

Figure 7C:
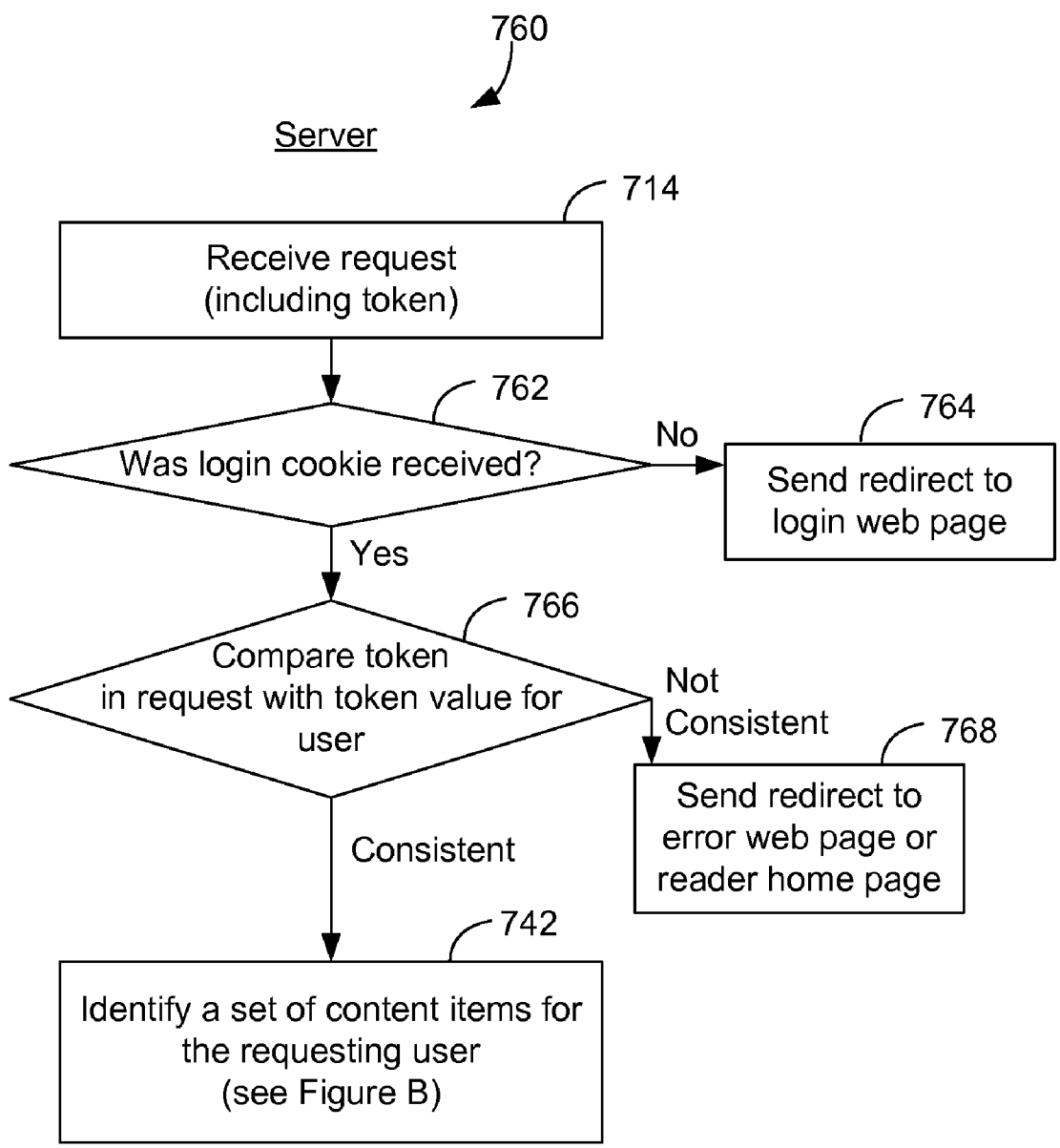

FIG. 7C is a flow diagram illustrating a process 760, performed by server computer 500, for receiving and verifying a request resulting from user selection of a bookmark. For security reasons, it is desirable to verify the request is, in fact, an authorized request from a respective user of the feed reader system before processing the request. In some embodiments, a valid request (702) initiated by user selection of the feed reader bookmark includes a token that uniquely corresponds to the user identifier of the requesting user, and a login cookie (also variously called an object, cookie file or cookie object) containing the requesting user's user ID. In one embodiment, the token is embedded as a parameter in the URL specified by the bookmark. The login cookie, if included in the request, is previously generated when the user logged in to the feed reader system or logged into a related system, such as a parent server system that provides a plurality of online services. It is noted that in the embodiments described here, the token and the user identifier are stored in separate objects (e.g., a bookmark and a cookie) so as to protect the integrity of the user's feed reader account. As will be described next, unless the user is in possession of both a login cookie and a bookmark having a token that corresponds to the user identifier in the cookie, the request generated by activating the bookmark will be rejected by the feed reader system.

Upon receiving a request (714), server 500 checks to see whether a login cookie, creating by previously logging in to the feed reader system, containing a user ID was received with the request (762). If no login cookie was received, server 500 sends client computer 400 a redirect to a login web page (764), from which the user may log in to the feed reader. Once the user has logged in to the feed reader, the user may select a bookmark and thereby initiate process 700 (FIG. 7A). If a login cookie was received, server 500 compares the token in the request to a stored token associated with the user (as identified by the user identifier in the login cookie), for example, token 688 stored in user preferences table 680. If the received token is consistent with the stored token, server 500 proceeds to identify a set of content items for the requesting user (742) and then perform the subsequent steps of process 740 (FIG. 7B), described above. However, if the received token is not consistent with the stored token, server 500 sends client 400 a redirect to, for example, a web page displaying an error message or a feed reader home page (768).

In some embodiments, a content feed bookmark functions as a link to a URL that corresponds to an online content feed aggregator. An example of a URL specified by a bookmark is:
http://www.domain1.com/reader/
bookmark?mode=nextitem&token=5782174&label=news
In this example, the value "5782174" in the URL is the token that uniquely corresponds to the user identifier of a user. The value shown for this token is merely illustrative; in practice, the number of digits of the token will be chosen based on cryptographic concerns. The parameters "mode=nextitem" and "label=news" specify that the document to be identified in step 718 of process 700 is the next unread item in News label 306. Different mode settings may be specified, for example, to specify that the item to be identified in step 718 is the home page of a content feed, or to invoke process 740 (FIG. 7B). If no label is specified, the document to be identified in response to selection of the bookmark may be provided by any content stream to which the user has subscribed.

Figure 8A:
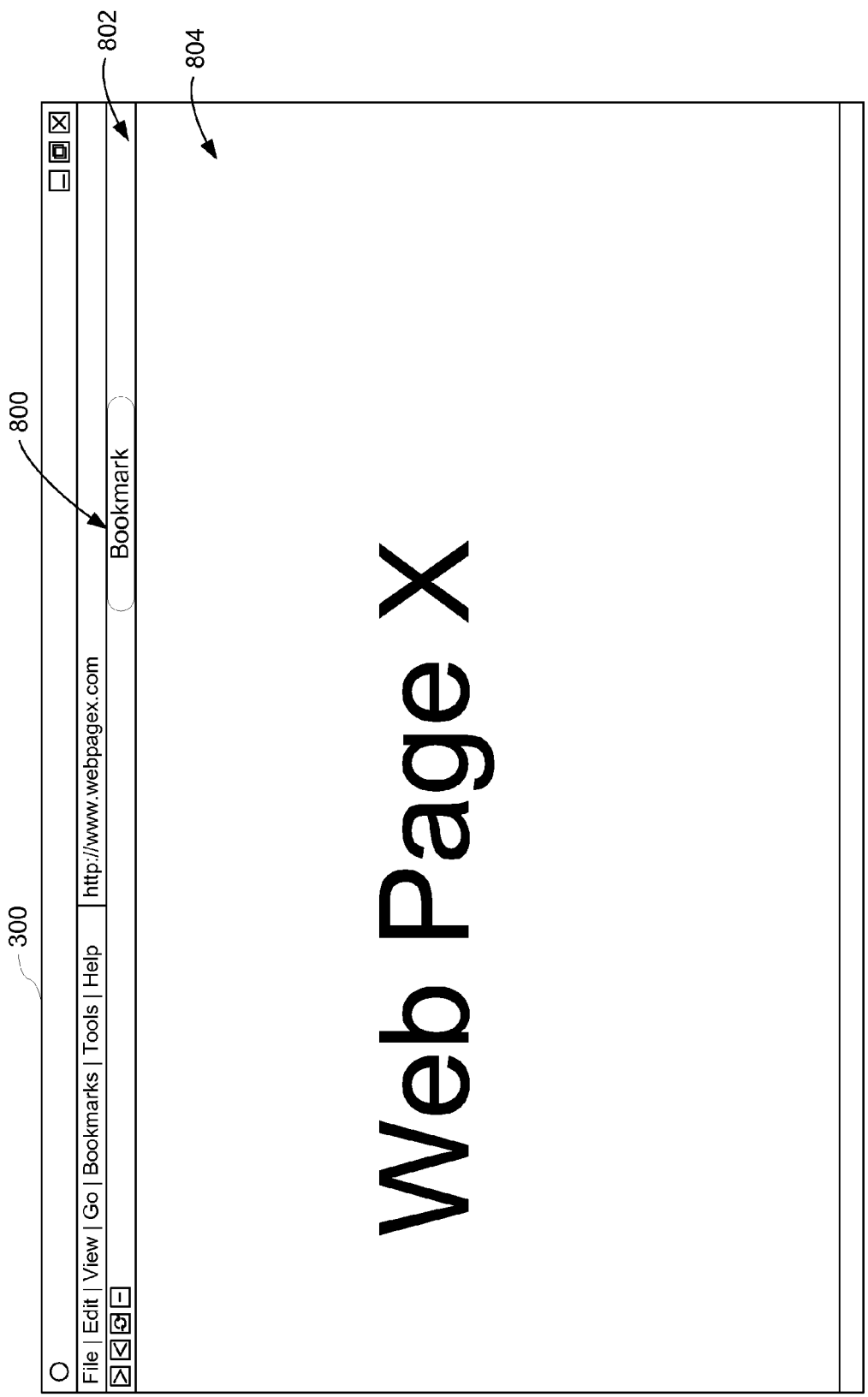
FIG. 8A is block diagram illustrating a feed reader user interface in accordance with some embodiments.

FIG. 8A is a schematic screenshot of a web browser 300 displaying a web page 804. Web browser 300 has a tool bar 802 containing a bookmark 800. Selecting bookmark 800, for example by clicking on it, initiates process 700, described with regards to FIG. 7A. Thus, instead of using a feed reader user interface such as the interface shown in FIG. 3A, a user may access feed reader content items simply by selecting bookmark 800.

Figure 8B:
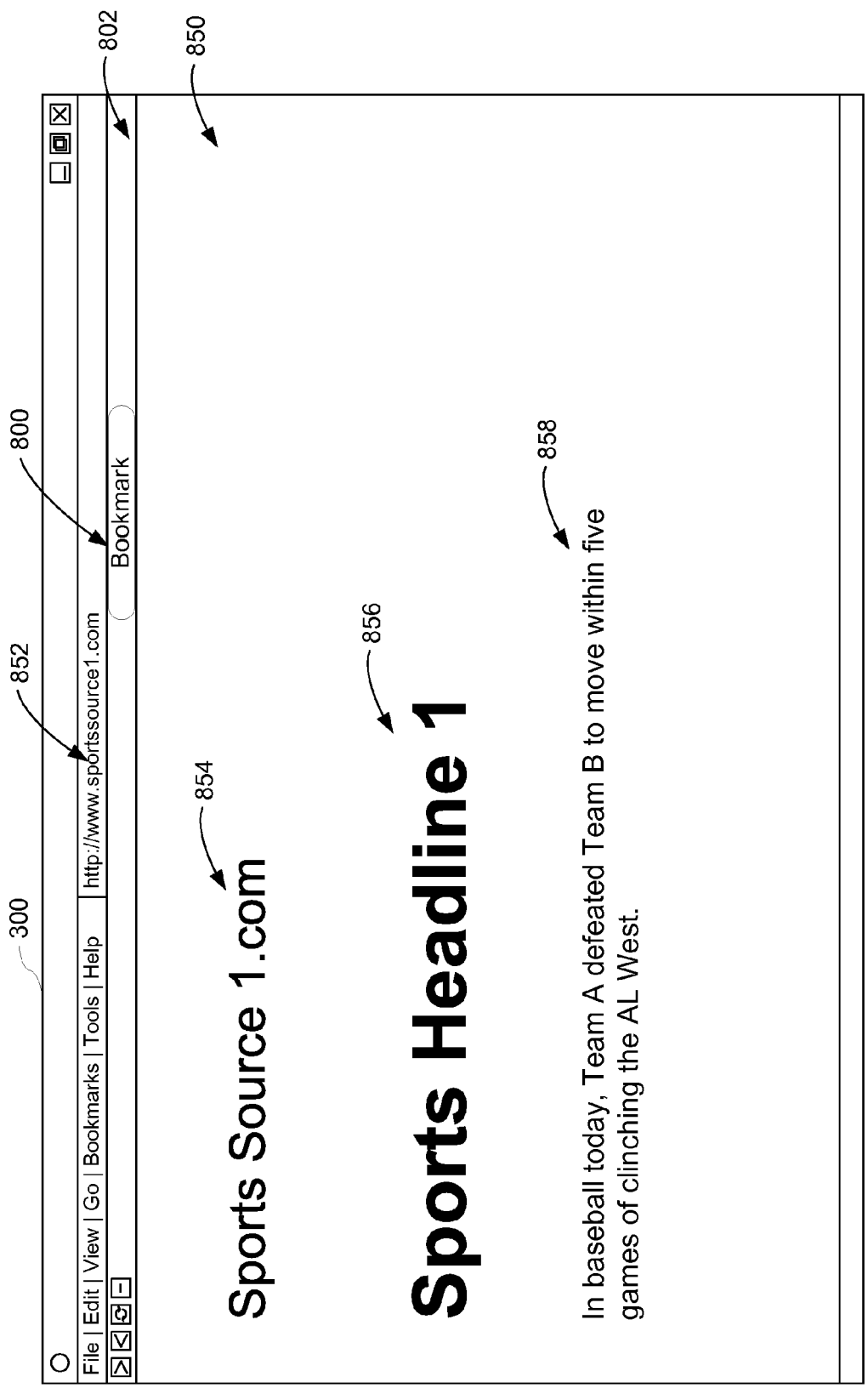
FIG. 8B is a block diagram illustrating a content item provided via the user interface of FIG. 8A, in accordance with some embodiments.

FIG. 8B is a schematic screenshot of a web browser 300 displaying a web page 850, in response to user selection of bookmark 800. In an embodiment, web page 850 corresponds to the most recent unread content item in the content feeds to which a user subscribes. Web page 850 is identified by a URL 852 corresponding to the source of the content item. In the example of FIG. 8B, web page 850 corresponds to content item 312 in FIG. 3A and content item 340 in FIG. 3B. In this example, web page 850 includes a source 854, a headline 856, and text 858, corresponding to the source, headline, and text of items 312 and 340. In another embodiment, web page 850 corresponds to an unread item identified according to other predefined selection criteria.

Figure 8C:
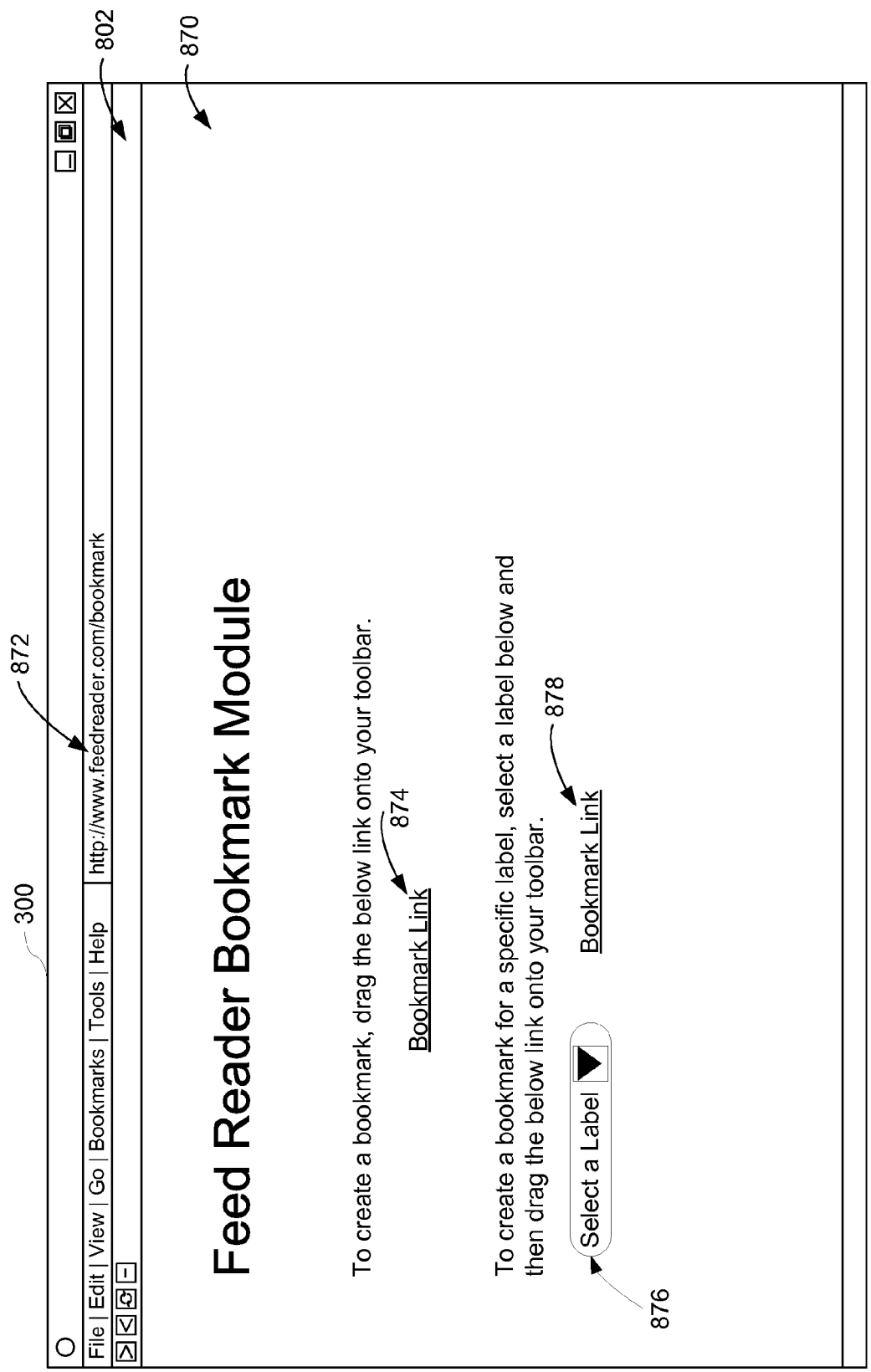
FIG. 8C is a block diagram illustrating a user interface for installing a bookmark on a browser toolbar, where the bookmark is for accessing one or more items of one or more content feeds to which the user has subscribed, in accordance with some embodiments.

FIG. 8C is a block diagram illustrating a user interface for installing a bookmark on a browser toolbar, where the bookmark is for accessing one or more items of one or more content feeds to which the user has subscribed, in accordance with some embodiments. Web browser 300 displays a web page 870, identified by a URL 872, that allows a user to create a bookmark on toolbar 802 of browser 300. Dragging bookmark link 874 onto toolbar 802 will create a bookmark 800 (see FIG. 8A). In some embodiments, selecting the bookmark created using bookmark link 874 will cause the browser to display the most recent unread content item from all of the content feeds to which a user subscribes. However, the user may prefer to create a bookmark for a specific label or folder in the user's feed reader account, by selecting a label from pull-down menu 876 and then dragging bookmark link 878 onto toolbar 802. In an embodiment, the resulting bookmark 800, when selected, will display the most recent unread content item in a set of content feeds associated with the selected label or folder. In other embodiments, other content items will be displayed in accordance with predefined selection criteria.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of presenting content, comprising:
at a client computer distinct from a server computer:
receiving an ordered list of content items from the server computer, each of the content items having an associated read state with respect to a user of the client computer, where the read state is stored at the server computer, wherein the items in the ordered list comprise content feed items from one or more content feeds;
displaying the ordered list of content items, including displaying a selected first item in an expanded format and a set of other items in a compact format,
responding to a user action for reading a second item by selecting the second item in the displayed list of content items, the selected second item being distinct from the first item, and redisplaying the ordered list of content items, including displaying the second item in the expanded format,
wherein the responding includes scrolling the displayed list such that an item displayed at a top of the list when the first item was the selected item is no longer displayed after the second item is selected and the ordered list of content items is redisplayed;
marking a previously selected content item as read in response to the previously selected item being scrolled off the top of the list, including transmitting information to the server indicating that the previously selected item has been read, so as to update a read state of the previously selected item with respect to the user.

2. The method of claim 1, wherein all items displayed in the compact format have a consistent display size.

3. The method of claim 1, wherein the items in the ordered list comprise content feed items from one or more content feeds.

4. The method of claim 1, wherein redisplaying the ordered list of content items comprises displaying the second item in the expanded format and displaying the first item in the compact format.

5. The method of claim 4, wherein redisplaying the ordered list decreases a number of displayed items when the second item displayed in the expanded format is larger than the first item displayed in the expanded format.

6. The method of claim 4, the method further including:
responding to a user action for reading a third item in the displayed list by redisplaying the ordered list of content items, including displaying the third item in the expanded format and displaying the first and second items in the compact format.

7. The method of claim 4, the method further including:
responding to a user action for reading a third item in the displayed list by redisplaying the ordered list of content items, including displaying the third item in the expanded format and displaying the second item in the compact format.

8. The method of claim 4, wherein a display size of a respective item when displayed in the expanded format corresponds to an amount of content in the respective item.

9. A client computer system for presenting content, comprising:
memory;
one or more processors; and
one or more programs stored in the memory and configured for execution by the one or more processors, the one or more programs including:
instructions to receive an ordered list of content items from the server computer, each of the content items having an associated read state with respect to a user of the client computer, where the read state is stored at the server computer, wherein the items in the ordered list comprise content feed items from one or more content feeds;
instructions to display the ordered list of content items, including instructions to display a selected first item in an expanded format and a set of other items in a compact format,
instructions to respond to a user action for reading a second item by selecting the second item in the displayed list of content items, the selected second item being distinct from the first item, and instructions to redisplay the ordered list of content items, including displaying the second item in the expanded format,
wherein the instructions to respond include instructions to scroll the displayed list such that an item displayed at a top of the list when the first item was the selected item is no longer displayed after the second item is selected and the ordered list of content items is redisplayed; and
instructions to mark a previously selected content item as read in response to the previously selected item being scrolled off the top of the list, including instructions to transmit information to the server indicating that the previously selected item has been read, so as to update a read state of the previously selected item with respect to the user.

10. The system of claim 9, wherein the plurality of content items comprise feed content items from one or more content feeds.

11. The computer system of claim 9, wherein all items displayed in the compact format have a consistent display size.

12. The computer system of claim 9, wherein the instructions to redisplay the ordered list of content items include instructions to display the second item in the expanded format and display the first item in the compact format.

13. The system of claim 12, wherein a display size of a respective item when displayed in the expanded format corresponds to an amount of content in the respective item.

14. The computer system of claim 12, further including:
instructions to respond to a user action for reading a third item in the displayed list by redisplaying the ordered list of content items, including displaying the third item in the expanded format and displaying the first and second items in the compact format.

15. The computer system of claim 12, further including:
instructions to respond to a user action for reading a third item in the displayed list by redisplaying the ordered list of content items, including displaying the third item in the expanded format and displaying the second item in the compact format.

16. A non-transitory computer readable storage medium storing one or more programs configured to be executed by a client computer system, the one or more programs comprising:
instructions to receive an ordered list of content items from the server computer, each of the content items having an associated read state with respect to a user of the client computer, where the read state is stored at the server computer, wherein the items in the ordered list comprise content feed items from one or more content feeds;
instructions to display the ordered list of content items, including instructions to display a selected first item in an expanded format and a set of other items in a compact format,
instructions to respond to a user action for reading a second item by selecting the second item in the displayed list of content items, the selected second item being distinct from the first item, and instructions to redisplay the ordered list of content items, including displaying the second item in the expanded format,
wherein the instructions to respond include instructions to scroll the displayed list such that an item displayed at a top of the list when the first item was the selected item is no longer displayed after the second item is selected and the ordered list of content items is redisplayed; and
instructions to mark a previously selected content item as read in response to the previously selected item being scrolled off the top of the list, including instructions to transmit information to the server indicating that the previously selected item has been read, so as to update a read state of the previously selected item with respect to the user.

17. The computer readable storage medium of claim 16, wherein the plurality of content items comprise feed content items from one or more content feeds.

18. The computer readable storage medium of claim 16, wherein all items displayed in the compact format have a consistent display size.

19. The computer readable storage medium of claim 16, wherein the instructions to redisplay the ordered list of content items include instructions to display the second item in the expanded format and display the first item in the compact format.

20. The computer readable storage medium of claim 19, wherein a display size of a respective item when displayed in the expanded format corresponds to an amount of content in the respective item.

21. The computer readable storage medium of claim 19, further including:
instructions to respond to a user action for reading a third item in the displayed list by redisplaying the ordered list of content items, including displaying the third item in the expanded format and displaying the first and second items in the compact format.

22. The computer readable storage medium of claim 19, further including:
instructions to respond to a user action for reading a third item in the displayed list by redisplaying the ordered list of content items, including displaying the third item in the expanded format and displaying the second item in the compact format.

* * * * *